US009486921B1

(12) United States Patent
Straszheim et al.

(10) Patent No.: US 9,486,921 B1
(45) Date of Patent: Nov. 8, 2016

(54) METHODS AND SYSTEMS FOR DISTRIBUTING REMOTE ASSISTANCE TO FACILITATE ROBOTIC OBJECT MANIPULATION

(71) Applicant: Google Inc., Mountain View, CA (US)

(72) Inventors: Troy Donald Straszheim, Mountain View, CA (US); Stefan Nusser, San Francisco, CA (US); Kevin William Watts, Palo Alto, CA (US); Ethan Rublee, Mountain View, CA (US); John William Zevenbergen, Saratoga, CA (US)

(73) Assignee: Google Inc., Mountain View, CA (US)

( * ) Notice: Subject to any disclaimer, the term of this patent is extended or adjusted under 35 U.S.C. 154(b) by 63 days.

(21) Appl. No.: 14/669,374

(22) Filed: Mar. 26, 2015

(51) Int. Cl.
G05B 19/04 (2006.01)
G05B 19/18 (2006.01)
B25J 9/16 (2006.01)

(52) U.S. Cl.
CPC ............. *B25J 9/1679* (2013.01); *B25J 9/1697* (2013.01); *Y10S 901/47* (2013.01)

(58) Field of Classification Search
CPC .... B25J 9/1679; B25J 9/1697; Y10S 901/47
USPC .......... 700/245, 250, 253, 257, 264
See application file for complete search history.

(56) References Cited

U.S. PATENT DOCUMENTS

| | | | | |
|---|---|---|---|---|
| 5,046,022 A | * | 9/1991 | Conway | G05B 19/427 700/250 |
| 5,446,835 A | * | 8/1995 | Iida | B25J 9/1687 700/259 |
| 7,185,774 B2 | | 3/2007 | Colgate et al. | |
| 7,996,114 B2 | * | 8/2011 | Ban | B25J 9/1697 382/153 |
| 8,467,597 B2 | * | 6/2013 | Monti | G06K 9/6211 382/153 |
| 8,794,181 B2 | | 8/2014 | Bareket | |
| 8,825,212 B2 | * | 9/2014 | Irie | B25J 9/1687 700/213 |

(Continued)

FOREIGN PATENT DOCUMENTS

| WO | 9615481 A2 | 5/1996 |
|---|---|---|
| WO | 2014145471 A1 | 9/2014 |

OTHER PUBLICATIONS

Laput et al., "Zensors: Adaptive, Rapidly Deployable, Human-Intelligent Sensor Feeds".

(Continued)

*Primary Examiner* — Jaime Figueroa
(74) *Attorney, Agent, or Firm* — McDonnell Boehnen Hulbert & Berghoff LLP

(57) ABSTRACT

Methods and systems for distributing remote assistance to facilitate robotic object manipulation are provided herein. Regions of a model of objects in an environment of a robotic manipulator may be determined, where each region corresponds to a different subset of objects with which the robotic manipulator is configured to perform a respective task. Certain tasks may be identified, and a priority queue of requests for remote assistance associated with the identified tasks may be determined based on expected times at which the robotic manipulator will perform the identified tasks. At least one remote assistor device may then be requested, according to the priority queue, to provide remote assistance with the identified tasks. The robotic manipulator may then be caused to perform the identified tasks based on responses to the requesting, received from the at least one remote assistor device, that indicate how to perform the identified tasks.

20 Claims, 11 Drawing Sheets

(56) References Cited

U.S. PATENT DOCUMENTS

| | | | |
|---|---|---|---|
| 9,050,723 B1 | 6/2015 | Elazary et al. | |
| 9,089,966 B2* | 7/2015 | Domae | B25J 9/1612 |
| 9,089,971 B2* | 7/2015 | Aoba | B25J 9/1697 |
| | | | 318/568.11 |
| 9,102,053 B2* | 8/2015 | Suzuki | B25J 9/1612 |
| 9,132,548 B2* | 9/2015 | Kamiya | B25J 9/1669 |
| 9,156,162 B2* | 10/2015 | Suzuki | B25J 9/16 |
| 9,238,304 B1* | 1/2016 | Bradski | B25J 9/163 |
| 9,283,680 B2* | 3/2016 | Yasuda | G06K 9/00201 |
| 9,327,397 B1* | 5/2016 | Williams | B25J 3/00 |
| 2001/0052708 A1* | 12/2001 | Schmalz | B65G 47/91 |
| | | | 294/65 |
| 2003/0046324 A1* | 3/2003 | Suzuki | G05B 19/042 |
| | | | 718/100 |
| 2006/0148063 A1* | 7/2006 | Fauzzi | G01N 1/31 |
| | | | 435/286.4 |
| 2008/0004749 A1 | 1/2008 | Hostettler | |
| 2012/0259462 A1* | 10/2012 | Aoba | B25J 9/1697 |
| | | | 700/245 |
| 2013/0123980 A1 | 5/2013 | Seo | |
| 2013/0211593 A1* | 8/2013 | Domae | B25J 9/1612 |
| | | | 700/258 |
| 2013/0290234 A1 | 10/2013 | Harris et al. | |
| 2013/0345873 A1 | 12/2013 | Blumberg et al. | |
| 2014/0163730 A1 | 6/2014 | Mian | |
| 2014/0277719 A1* | 9/2014 | Kamiya | B25J 9/1669 |
| | | | 700/253 |
| 2014/0365010 A1* | 12/2014 | Yasuda | G06K 9/00201 |
| | | | 700/259 |
| 2015/0248131 A1* | 9/2015 | Fairfield | G05D 1/0044 |
| | | | 701/2 |
| 2015/0314246 A1* | 11/2015 | Lehtonen | B01F 13/0818 |
| | | | 700/265 |
| 2016/0129592 A1* | 5/2016 | Saboo | B25J 9/1661 |
| | | | 700/248 |

OTHER PUBLICATIONS

"Interactive Perception: From Scenes to Objects", Niklas Bergstrom, KTH Royal Institute of Technology, SE, 2012.

* cited by examiner

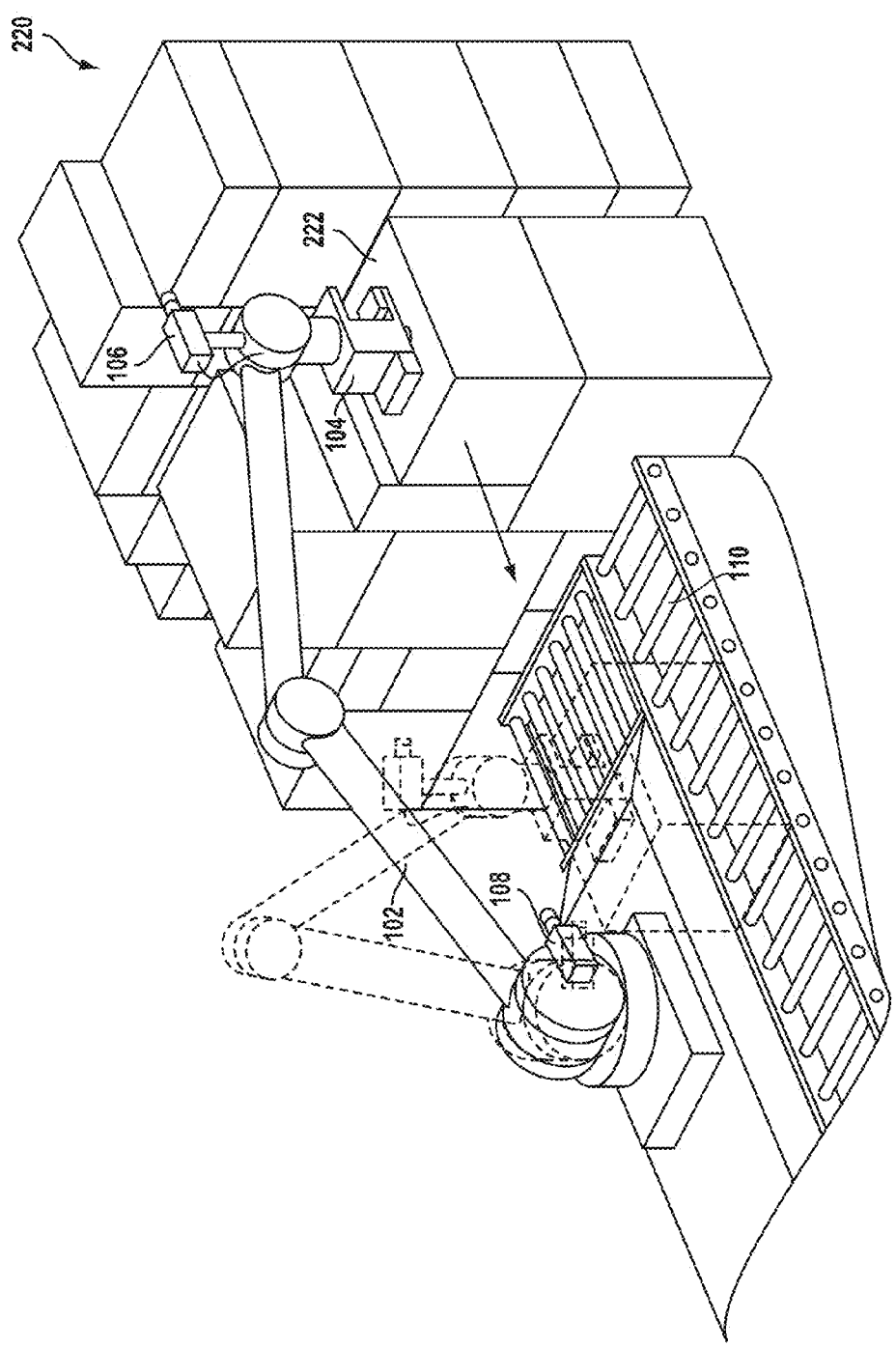

METHODS AND SYSTEMS FOR DISTRIBUTING REMOTE ASSISTANCE TO FACILITATE ROBOTIC OBJECT MANIPULATION

BACKGROUND

Unless otherwise indicated herein, the materials described in this section are not prior art to the claims in this application and are not admitted to be prior art by inclusion in this section.

Robotic systems, such as a robotic arm containing a gripping component, may be used for applications involving picking up or moving objects. For instance, a robotic device may be used to fill a container with objects, create a stack of objects, or unload objects from a given area. In some cases, all of the objects may be of the same type. In other cases, a container or truck may contain a mix of different types of objects, such as boxed items, cans, tires, or other objects of varying weights and sizes. Such robotic systems may direct a robotic arm to pick up objects based on predetermined knowledge of where objects are in the environment. Such robotic systems may also direct a robotic arm to pick up objects based on predetermined knowledge of what types of objects the robotic arm can manage (e.g., based on whether a gripper or other robotic manipulator can support a weight of the object while moving or otherwise interacting with the object at various accelerations).

SUMMARY

Example systems and methods may provide for distributing remote assistance requests to remote assistor devices in order to facilitate object manipulation by robotic devices. More specifically, a system configured to control a robotic manipulator may identify various tasks involving object manipulation for which the system can request remote assistance, such as determining a segmentation of a model of boxes. The system can build a priority queue of such requests based on how soon the robotic manipulator is scheduled to perform the identified task. The system may then request remote assistance from various remote assistor devices, in accordance with the priority queue, and then perform the identified tasks based on responses received from the remote assistor devices. Within examples, the system can also maintain records indicating whether remote assistor devices have provided helpful responses that have enabled the robotic manipulator to correctly perform the identified tasks. Such records can be used to compare the usefulness of one remote assistor device's feedback with the usefulness of other remote assistor devices' feedback, perhaps in a competitive game scenario for instance.

In one aspect, the present application describes a computing system for controlling a robotic manipulator. The computing system may comprise at least one processor, and data storage comprising instructions executable by the at least one processor to cause the computing system to perform operations. The operations may include determining, from a model of a set of objects in an environment of the robotic manipulator, a plurality of regions of the model, where each region corresponds to a respective different subset of the set of objects, and where the robotic manipulator is configured to perform, for each subset of objects, a respective task involving a manipulation of the subset of objects. The operations may also include identifying a plurality of the tasks for which the computing system will request remote assistance. The operations may further include determining a priority queue of requests for remote assistance associated with the identified tasks based on expected times at which the robotic manipulator will perform the identified tasks for each subset of objects. The operations may still further include requesting, according to the priority queue and from at least one remote assistor device, remote assistance associated with the identified tasks. The operations may yet still further include receiving, from the at least one remote assistor device, a plurality of responses to the requesting, where each response includes information indicative of how to perform the manipulation of the respective subset of objects. The operations may yet still further include causing the robotic manipulator to perform the identified tasks based at least in part on the plurality of responses received from the at least one remote assistor device.

In another aspect, the present application describes a method. The method may involve determining, from a model of a set of objects in an environment of a robotic manipulator, a plurality of regions of the model, where each region corresponds to a respective different subset of the set of objects, and where the robotic manipulator is configured to perform, for each subset of objects, a respective task involving a manipulation of the subset of objects. The method may also involve identifying a plurality of the tasks for which the computing system will request remote assistance. The method may further involve determining a priority queue of requests for remote assistance associated with the identified tasks based on expected times at which the robotic manipulator will perform the identified tasks for each subset of objects. The method may still further involve requesting, according to the priority queue and from at least one remote assistor device, remote assistance associated with the identified tasks. The method may yet still further involve receiving, from the at least one remote assistor device, a plurality of responses to the requesting, where each response includes information indicative of how to perform the manipulation of the respective subset of objects. The method may yet still further involve causing the robotic manipulator to perform the identified tasks based at least in part on the plurality of responses received from the at least one remote assistor device.

In another aspect, the present application describes a non-transitory computer readable medium having stored thereon instructions that, upon execution by a computing system configured to control a robotic manipulator, cause the computing system to perform operations. The operations may include determining, from a model of a set of objects in an environment of the robotic manipulator, a plurality of regions of the model, where each region corresponds to a respective different subset of the set of objects, and where the robotic manipulator is configured to perform, for each subset of objects, a respective task involving a manipulation of the subset of objects. The operations may also include identifying a plurality of the tasks for which the computing system will request remote assistance. The operations may further include determining a priority queue of requests for remote assistance associated with the identified tasks based on expected times at which the robotic manipulator will perform the identified tasks for each subset of objects. The operations may still further include requesting, according to the priority queue and from at least one remote assistor device, remote assistance associated with the identified tasks. The operations may yet still further include receiving, from the at least one remote assistor device, a plurality of responses to the requesting, where each response includes information indicative of how to perform the manipulation of the respective subset of objects. The operations may yet still further include causing the robotic manipulator to perform the identified tasks based at least in part on the plurality of responses received from the at least one remote assistor device.

In yet another aspect, a system is provided that includes a means for determining, from a model of a set of objects in an environment of a robotic manipulator, a plurality of regions of the model, where each region corresponds to a respective different subset of the set of objects, and where the robotic manipulator is configured to perform, for each subset of objects, a respective task involving a manipulation of the subset of objects. The system may also include a means for identifying a plurality of the tasks for which the computing system will request remote assistance. The system may further include a means for determining a priority queue of requests for remote assistance associated with the identified tasks based on expected times at which the robotic manipulator will perform the identified tasks for each subset of objects. The system may still further include a means for requesting, according to the priority queue and from at least one remote assistor device, remote assistance associated with the identified tasks. The system may yet still further include a means for receiving, from the at least one remote assistor device, a plurality of responses to the requesting, where each response includes information indicative of how to perform the manipulation of the respective subset of objects. The system may yet still further include a means for causing the robotic manipulator to perform the identified tasks based at least in part on the plurality of responses received from the at least one remote assistor device.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

FIG. 2C shows the robotic arm from FIG. 2A moving a box, according to an example implementation.

DETAILED DESCRIPTION

Figure 1A:
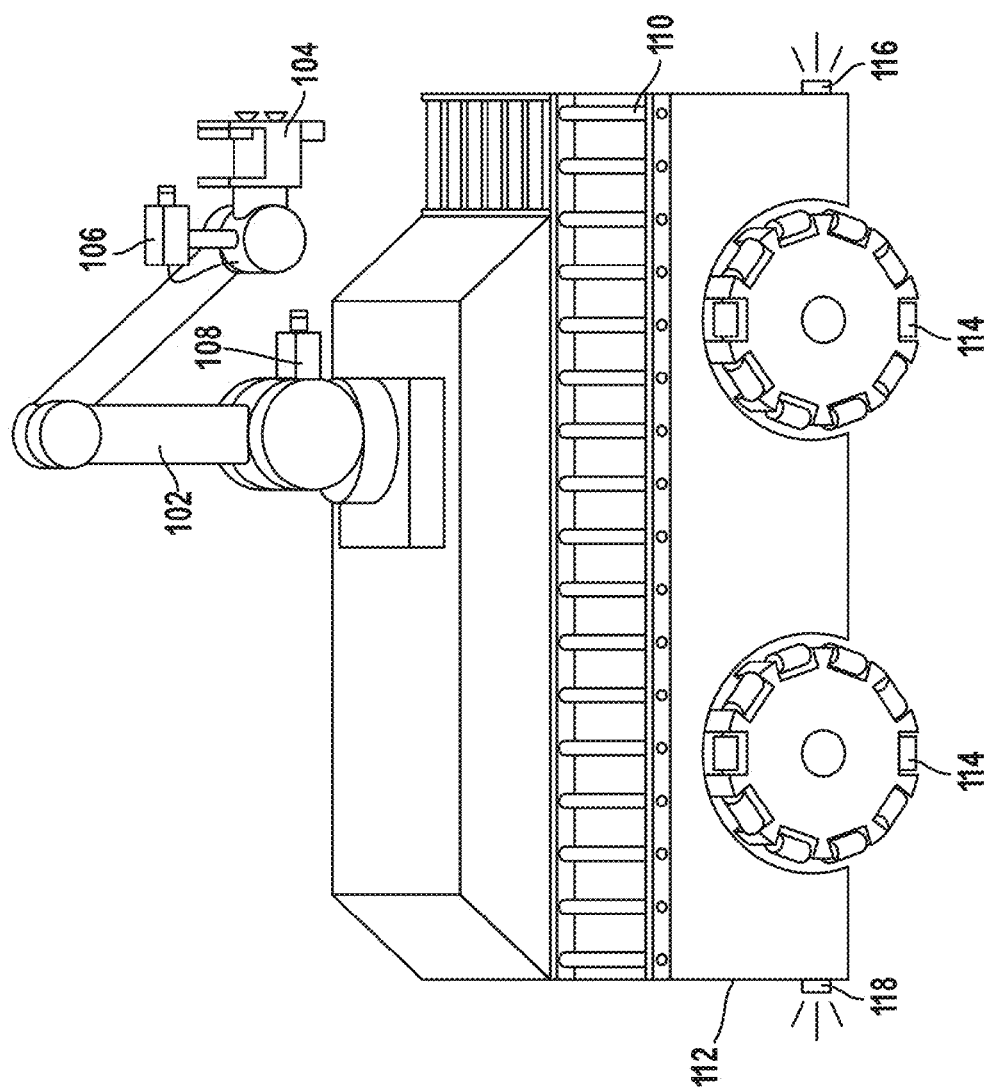
FIG. 1A shows a robotic arm mounted on a moveable cart, according to an example implementation.

Example methods and systems are described herein. Any example implementation or feature described herein is not necessarily to be construed as preferred or advantageous over other implementations or features. The example implementations described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other implementations might include more or less of each element shown in a given Figure. Further, some of the illustrated elements may be combined or omitted. Yet further, an example implementation may include elements that are not illustrated in the Figures.

In the following description, the terms "robotic device" and "robotic manipulator" may be used interchangeably to refer to a robotic device that is configured to manipulate (e.g., grab, move, drop, etc.) objects.

Further, the term "box" may refer to any object or item that can be placed onto a pallet or loaded onto or unloaded from a truck or container. For example, in addition to rectangular solids, "boxes" can refer to cans, drums, tires or any other "simple" shaped geometric items. Additionally, "boxes" may refer to totes, bins, or other types of containers which may contain one or more items for transport or storage. For instance, plastic storage totes, fiberglass trays, or steel bins may be moved or otherwise manipulated by robots within a warehouse. Examples herein may also be applied toward objects other than boxes as well, and toward objects of various sizes and shapes.

Still further, the terms "workplace" and "warehouse" may refer to any physical environment in which boxes or other objects may be manipulated, processed, and/or stored by robotic devices. In some examples, a warehouse may be a single physical building or structure, which may additionally contain certain fixed components, such as pallet racks for storing pallets of objects.

Yet still further, the terms "sensor," "camera," or "optical sensor" may be used interchangeably and may refer to device or devices (mono or stereo arrangements) configured to perform three-dimensional (3D) image sensing, 3D depth sensing, two-dimensional (2D) image sensing, 2D depth sensing (i.e., 2D image and corresponding depth map), and/or other types of sensing of a physical environment of the device.

An example arrangement includes a robotic device that occupies a physical workspace and a control system configured to control the robotic device. The robotic device may be a robotic manipulator arranged to manipulate objects in its workspace. In order to enable the robotic manipulator to manipulate such objects, the control system may first determine a model of the environment including the objects (e.g., a façade of boxes or other objects), and use the model to determine various types of information associated with the objects that will enable the robotic manipulator to interact with the objects. Such information may include an identification of the objects in the workspace (e.g., determining edges, corners, etc. of the objects and segmenting the objects, so as to distinguish the objects from each other).

Once the objects are identified, the control system can then determine other related information such as where to grab the objects and/or an order in which to instruct the robotic manipulator to pick up each object in a group of objects, among other possibilities.

With this arrangement, scenarios may arise in which the control system may not be able to determine such information on its own, may determine incorrect information, or may be uncertain as to whether the information it has determined is sufficient for enabling the robotic manipulator to manipulate objects in the desired manner. In such scenarios, the control system may engage in a process in which the control system requests various types of remote assistance (e.g., human assistance) with certain tasks to perform, and uses feedback information received from remote assistors as a basis for instructing the robotic manipulator to perform each of those tasks.

As part of this process, the control system may identify tasks with which the control system may need remote assistance. In particular, when the control system has a low confidence level in being able to correctly perform a given task, the control system may identify the given task as a task for which the control system should request remote assistance. As an example task, the control system may attempt to determine, from a model of various boxes present in the robotic manipulator's workspace, various "box hypotheses" (e.g., hypothesized edges, corners, borders, etc. of the boxes that correspond to the actual edges, corners, borders, etc. of the boxes in the workspace) so as to segment the model. If the control system is not confident that a particular box hypothesis is accurate, the control system may request remote assistance with confirming, rejecting, or adjusting the particular box hypothesis. Whereas, when the control system's confidence level for a particular box hypothesis is high, the control system may determine that no remote assistance is necessary.

The control system may request remote assistance for other tasks as well, in addition to or alternative to segmenting a model of objects. For example, the control system may request remote assistance for determining a sequenced order in which the robotic manipulator should manipulate the objects. As another example, the control system may request remote assistance for determining one or more locations on one or more of the objects at which the robotic manipulator should grab or otherwise interact with the object(s).

After identifying the tasks for which remote assistance will be requested, the control system may then determine a queue of requests for remote assistance corresponding to the identified tasks and distribute the requests to at least one remote assistor device. Herein, a "remote assistor device" may be a computing device operated by a human user through which the human user can provide feedback information in response to receiving the requests for remote assistance, such as a tablet computer, laptop computer, smartphone, and the like. Additionally or alternatively, a remote assistor device may be a remote automated computing system more powerful than the control system (e.g., more learned than the control system with respect to the identified tasks). In some examples, the control system may determine the queue based on how soon the respective identified tasks are expected to be performed. For instance, if the control system needs assistance with segmenting a model of a stack of boxes, the control system may assign a higher priority to sending out a request for assistance with segmenting a region of boxes on the top row of the stack and may assign a lower priority to sending out a request for assistance with segmenting a region of boxes that are lower in the stack, because the robotic manipulator would likely remove boxes at the top of the stack before removing boxes elsewhere on the stack. It may be desirable to prioritize requests in the queue in this way in order to avoid impeding or delaying robotic operation. However, the control system could prioritize in other ways as well. For instance, prioritizing which remote assistor device responses are processed before other remote assistor device responses may help avoid impeding or delaying robotic operation as well.

Upon receipt of a given request from the control system, the remote assistor device may provide an interface that may enable the human user of the remote assistor device to provide a response to that request. For instance, in response to receiving a request, the remote assistor device may display a region of the model including multiple box hypotheses for which that the control system has requested remote assistance. The human user can then use the interface (e.g., a touchscreen, mouse, keyboard, and the like) to provide a response back to the control system that confirms, rejects, or adjusts the each of the multiple box hypotheses. Generally, the response may include information that indicates to the control system how to perform the respective task for which the control system requested remote assistance. After receiving the responses from the remote assistor device(s), the control system may control the robotic manipulator to perform the identified tasks corresponding to each region of the model, in accordance with the responses.

Furthermore, in some examples, the control system may send out one or more requests from the queue in parallel across multiple remote assistor devices. For instance, when an identified task is a particularly important task (e.g., urgent and/or complex), the control system may send out the same request to multiple remote assistor devices and then consolidate the responses from the multiple remote assistor devices in order to perform the identified task, perhaps removing redundancy during consolidation. Additionally or alternatively, the control system may send out multiple different requests to multiple remote assistor devices. As such, each request may correspond to an identified task that is to be performed with respect to the objects in a respective region of the model rather than the model as a whole. For instance, instead of sending a single request for human assistance with the task of determining box hypotheses for all the objects in the robotic manipulator's workspace, the control system may divide the model into regions and send out, for each region, a request for human assistance in determining box hypotheses for a subset of objects in that region. By this process, human assistors would not need to see the entire workspace. Also by this process, the control system can more efficiently receive and use human feedback to manipulate objects in the workspace because different human assistors can handle different requests all at the same time.

In some examples, the process described above can be implemented in a competitive, game-like scenario. For instance, the control system may distribute requests to multiple remote assistor devices, and human assistors may receive performance ratings based on whether or not robotic manipulators or other robotic devices have successfully performed tasks based on the human assistor's responses. The control system may rank human users based on their performance rankings in order to promote friendly social competition and thereby encourage efficient and precise remote assistance in the workplace or amongst multiple workplaces.

In other examples, instead of the control system determining regions of a model, the control system may determine a plurality of portions of a video feed (e.g., clips or frames), such as a video stream from a security robot in the workplace. The control system may distribute the portions of the video stream to various remote assistor devices so that human assistors can analyze the portions and identify any undesirable entity, such as an obstacle or other hazard in the way of a robotic device's path. The control system may then use the responses received from the remote assistor devices to remove identified undesirable entities from the workplace or to avoid such entities. Other example implementations are possible as well.

Reference will now be made in detail to various implementations, examples of which are illustrated in the accompanying drawings. In the following detailed description, numerous specific details are set forth in order to provide a thorough understanding of the present disclosure and the described implementations. However, the present disclosure may be practiced without these specific details. In other instances, well-known methods, procedures, components, and circuits have not been described in detail so as not to unnecessarily obscure aspects of the implementations.

While some robotic devices may be fixed at a location in an environment, in some implementations, a robotic device can be made mobile by coupling the robotic device with a wheeled base, a holonomic base (e.g., a base that can move in any direction), or rails on the ceiling, walls or floors. According to various implementations, a robotic manipulator may be mounted on a holonomic base (e.g., a base with wheels that allow the base to move in any direction). FIG. 1A depicts an exemplary holonomic base containing a robotic manipulator. In some implementations, a moveable base 112 may include a robotic arm 102 mounted on the base 112. The robotic arm 102 may contain a gripping component 104 for gripping objects within the environment. The base may contain one or more wheels 114, which may be holonomic wheels that operate with two degrees of freedom. In further implementations, a wraparound front conveyor belt 110 may be included on the holonomic base 112. In some examples, the wraparound front conveyer belt 110 may allow the robot to not have to rotate its gripper to the left or right when unloading or loading boxes from or to a truck container or pallet.

In other examples, the robotic manipulator may be mounted on a different type of movable apparatus or may not be mounted on a movable base at all. For example, the robotic manipulator may be mounted at a fixed position within a factory setting. In still other examples, one or more robotic manipulators may be mounted on rails of a truck or container. In such examples, the robotic manipulators may be used to load or unload the truck or container.

Figure 1B:
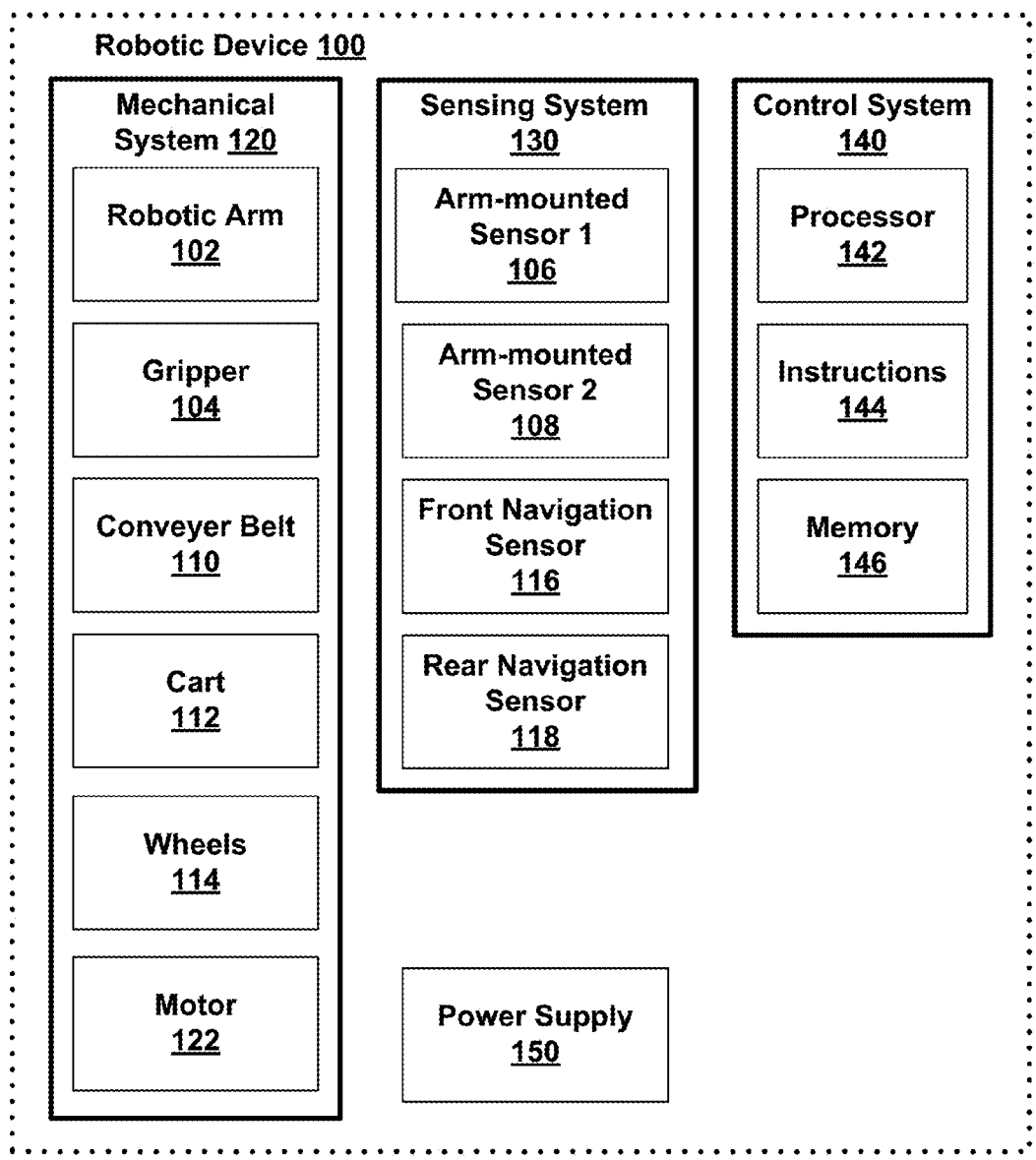
FIG. 1B is an operational block diagram illustrating a robotic device, according to an example implementation.

FIG. 1B is a functional block diagram illustrating a robotic device 100, according to an example implementation. The robotic device 100 could include various subsystems such as a mechanical system 120, a sensing system 130, a control system 140, as well as a power supply 150. The robotic device 100 may include more or fewer subsystems and each subsystem could include multiple elements. Further, each of the subsystems and elements of robotic device 100 could be interconnected. Thus, one or more of the described operations of the robotic device 100 may be divided up into additional operational or physical components, or combined into fewer operational or physical components. In some examples, additional operational and/or physical components may be added to the examples illustrated by FIGS. 1A and 1B.

The mechanical system 120 may include components described above with respect to FIG. 1A, including a robotic arm 102, a gripper 104, a conveyer belt 110, a (movable or holonomic) base 112, and one or more wheels 114. The mechanical system 120 may additionally include a motor 122, which may be an electric motor powered by electrical power, or may be powered by a number of different energy sources, such as a gas-based fuel or solar power. Additionally, motor 122 may be configured to receive power from power supply 150. The power supply 150 may provide power to various components of robotic device 100 and could represent, for example, a rechargeable lithium-ion or lead-acid battery. In an example implementation, one or more banks of such batteries could be configured to provide electrical power. Other power supply materials and types are also possible.

The sensing system 130 may use one or more sensors attached to a robotic arm 102, such as sensor 106 and sensor 108, which may be 2D sensors and/or 3D depth sensors that sense information about the environment as the robotic arm 102 moves. The sensing system 130 may determine information about the environment that can be used by control system 140 (e.g., a computer running motion planning software) to pick and move boxes efficiently. The control system 140 could be located on the device or could be in remote communication with the device. In further examples, scans from one or more 2D or 3D sensors mounted on a mobile base, such as a front navigation sensor 116 and a rear navigation sensor 118, and one or more sensors mounted on a robotic arm, such as sensor 106 and sensor 108, may be integrated to build up a digital model of the environment, including the sides, floor, ceiling, and/or front wall of a truck or other container. Using this information, the control system 140 may cause the mobile base to navigate into a position for unloading or loading objects, for instance.

Within examples, the robotic arm 102 may be equipped with a gripper 104, such as a digital suction grid gripper. In such implementations, the gripper may include one or more suction valves that can be turned on or off either by remote sensing, or single point distance measurement and/or by detecting whether suction is achieved. In additional examples, the digital suction grid gripper may include an articulated extension. In some implementations, the potential to actuate suction grippers with rheological fluids or powders may enable extra gripping on objects with high curvatures. Other types of grippers are possible as well.

In some implementations, the gripper could potentially span several boxes or objects and turn on suction for some or all of the covered objects. In some implementations, the suction or adhesion devices may be a "digital" grid so that the robotic device can turn on any number of the suction devices as will fit boxes sensed for grabbing. In some implementations, the system may notice a seam in the boxes (separation between adjacent boxes) such that suction devices can be activated on both sides of the seam to pick up both boxes at once, thereby doubling the throughput. In some implementations, the suction devices can sense after a certain amount time whether they can successfully grip a surface, after which they may automatically shut off. In further implementations, sections of the suction devices can fold down to grasp the top of the boxes. For instance, grippers can initially start at full extension and then conform to the surface being gripped.

In further examples, the robotic arm can implement a wiggle movement to improve a suction grip. In additional implementations, the robotic arm can wiggle a box side-to-side to help segment the box from its surroundings. In other implementations, the arm can wiggle upon pick up of the box to avoid jostling other objects. In such implementations, when trying to adhere to an object in order to pick it up using suction, the robotic arm may employ a wiggle motion in order to make a firm seal against the object. In further examples, the robotic arm may wiggle the object as the robotic arm is picking up the object so that the box can more gently break friction or overlap contact with other items. This may help avoid a situation where pulling the object up too directly or too quickly causes other items to be tossed into the air. According to various implementations, physical objects can have concave, convex or otherwise rumpled faces that make it hard for a suction device to adhere to. Thus, wiggling the suction device as the device makes suction contact may enable a more reliable grip on physical objects, both planar and non-planar objects.

In other examples, one or more of the sensors used by a sensing system may be a RGBaD (RGB+active Depth) color or monochrome camera registered to a depth sensing device that uses active vision techniques such as projecting a pattern into a scene to enable depth triangulation between the camera or cameras and the known offset pattern projector. This type of sensor data may help enable robust segmentation. According to various implementations, cues such as barcodes, texture coherence, color, 3D surface properties, or printed text on the surface may also be used to identify an object and/or find its pose in order to know where and/or how to place the object (e.g., moving the object slowly due to the object being fragile). In some implementations, shadow or texture differences may be employed to segment objects as well.

Many or all of the operations of robotic device 100 could be controlled by control system 140. Control system 140 may include at least one processor 142 (which could include at least one microprocessor) that executes instructions 144 stored in a non-transitory computer readable medium, such as the memory 146. The control system 140 may also represent a plurality of computing devices that may serve to control individual components or subsystems of the robotic device 100 in a distributed fashion.

In some implementations, memory 146 may contain instructions 144 (e.g., program logic) executable by the processor 142 to execute various operations of robotic device 100, including those described above in connection with FIGS. 1A-1B. Memory 146 may contain additional instructions as well, including instructions to transmit data to, receive data from, interact with, and/or control one or more of the mechanical system 120, the sensor system 130, and/or the control system 140.

Figure 2A:
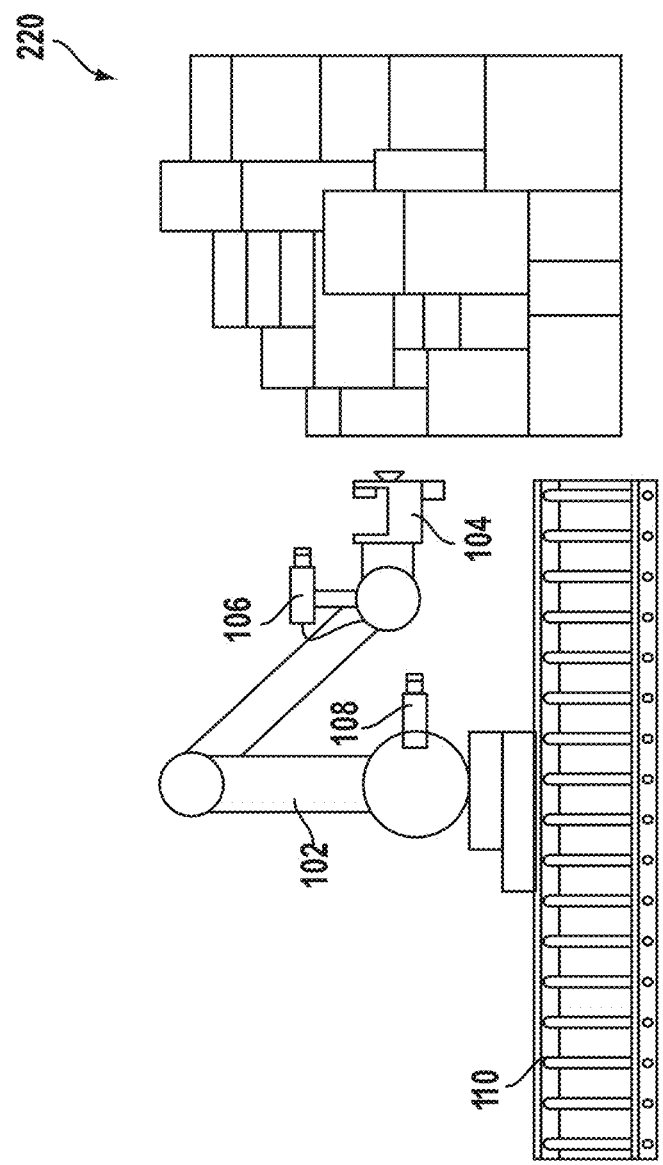
FIG. 2A shows a robotic arm and a stack of boxes, according to an example implementation.

According to various implementations, a perception guided robot is described. For instance, a robotic device may utilize a combination of perception together with planning to guide the robot arm to pick up a box and place the box where it needs to go. FIG. 2A illustrates part of the robotic device from FIG. 1A with a stack of boxes, according to an example implementation. As shown, the robotic device may include a robotic arm 102 with a gripping component 104, sensors 106 and 108, and conveyer 110 as described above. In some examples, the robotic device could be mounted on a holonomic base as described with respect to FIG. 1A, could be mounted on a different type of movable apparatus, could be mounted on rails or tracks, or could be stationary. The robotic device may be controlled to pick boxes from a stack of boxes 220 containing a heterogeneous mix of shapes and sizes of boxes.

Figure 2B:
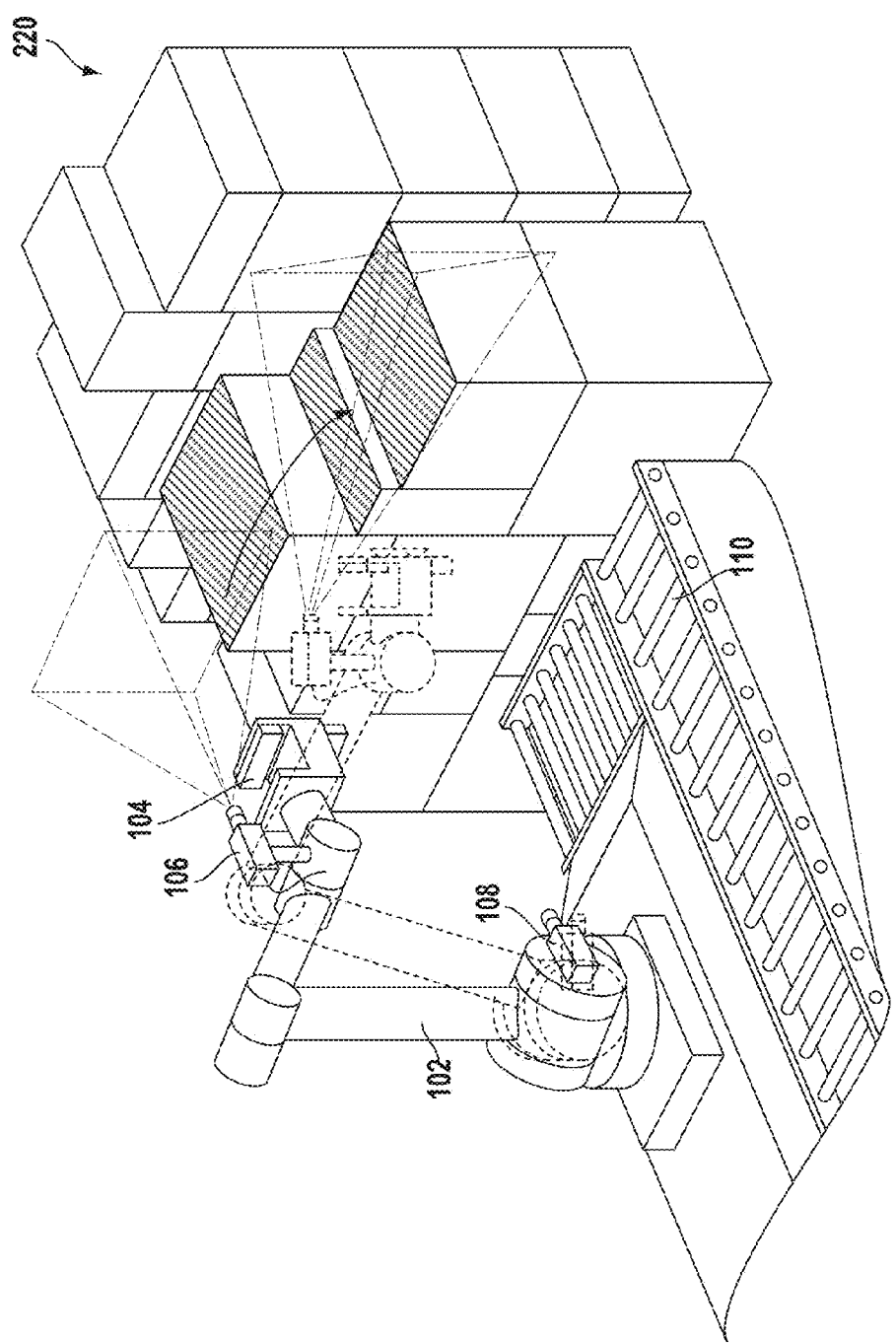
FIG. 2B shows scanning of the stack of boxes from FIG. 2A by a sensor mounted on the robotic arm, according to an example implementation.

Within examples, a virtual environment including a model of the objects in 2D and/or 3D may be determined and used to develop a plan or strategy for picking up the boxes. In some examples, the robot may use one or more sensors to scan an environment containing objects, as shown in FIG. 2B. As the robotic arm 102 moves, a sensor 106 on the arm may capture sensor data about the stack of boxes 220 in order to determine shapes and/or positions of individual boxes. In additional examples, a larger picture of a 3D environment may be built up by integrating information from individual (e.g., 3D) scans. Sensors performing these scans may be placed in fixed positions, on a robotic arm, and/or in other locations. According to various implementations, scans may be constructed and used in accordance with any or all of a number of different techniques.

In some examples, scans can be made by moving a robotic arm upon which one or more 3D sensors are mounted. Feedback from the arm position may provide pose information about where the sensor is positioned and may be used to help with the integration. Alternately, or additionally, scans may be made using one or more 2D sensors, for instance by leveraging motion and tracking key-points in the environment. In further examples, scans may be from fixed-mount cameras that have fields of view (FOVs) covering a given field. In additional examples, scans may be visually registered to help with fine pose estimation, potentially giving better integration results.

In further examples, a virtual environment may be built up using a 3D volumetric or surface model to integrate information (e.g., from different sensors). This may allow the system to operate within a larger environment, such as in cases where one sensor may be insufficient to cover a large environment. Such techniques may also increase the level of detail captured, which may help the robotic device perform various tasks. In particular, integrating information can yield finer detail than from a single scan alone (e.g., by bringing down noise levels). This may enable better object detection, surface picking, or other applications.

In further examples, wide-angle environment reconstruction may be performed by sensing an environment and extracting that information into a simplified geometric model of simple mathematical 3D geometric forms (e.g., planes, cylinders, cones, hemispheres, etc.). In some instances, such techniques may make motion planning easier and/or may make violation of the models (e.g., collisions) easier to detect. Alternately, or additionally, such techniques may allow a parametric description to extend the environment. For instance, the ground may be treated as a plane that extends behind objects that occlude it.

In additional examples, planes or other mathematical surfaces in the environment may be extracted in 3D. These known "ideal" surface detections may be combined into a more accurate model of the environment. For instance, planes may be used to determine the full extents of walls (or mathematical description thereof) and other obstacles to avoid collisions and detect the locations of objects of interest. Also, mathematical representations of objects may be used to look for anomalies such as a person entering into an environment. Such events may violate the ideal model, which may make their detection easier.

In other examples, certain objects such as boxes may have simple planar form. For instance, a metal object may have a geometric form of a cylinder and a tire may have a geometric form of a torus. Example systems may leverage this trait of certain objects in order to model them and/or determine how to motion plan for the objects. For instance, known templates of certain shapes can be used to refine detected features of objects within the environment that appear to match a particular shape.

In some examples, 2D and 3D information may be represented at least in part via one or more facades. A facade may be defined as a near-planar construct containing a set of objects, represented as a depth map (e.g., a 2D map with distances as a third dimension). Examples of facades may include a wall of boxes in a truck, a top of a pallet stack containing boxes or other objects, or a top of a bin of jumbled objects.

In further examples, a facade may be constructed from boxes, for instance to plan an order for picking up the boxes. For instance, as shown in FIG. 2C, box 222 may be identified by the robotic device as the next box to pick up. Box 222 may be identified within a facade representing a front wall of the stack of boxes 220 constructed based on sensor data collected by one or more sensors, such as sensors 106 and 108. A control system may then determine that box 222 is the next box to pick, possibly based on its shape and size, its position on top of the stack of boxes 220, and/or based on characteristics of a target container or location for the boxes. The robotic arm 102 may then be controlled to pick up the box 222 using gripper 104 and place the box 222 onto the conveyer belt 110 (e.g., to transport box 222 into a storage area).

In additional examples, a facade may be represented as an orthographic projection of 3D surface information. This representation may allow for parsing the facade to determine interesting areas for a particular application. For example, in truck unloading, the upper left corner of the next box to pick up may be determined based on a facade representation. In other examples, an orthographic projection of an integrated 3D environment may be determined to give a wide-FOV, easily-parsed representation for performing application-related tasks. One such task may be finding the corner or corners (e.g., top left) of a box to pick. Another such task may involve finding good surfaces (e.g., relatively flat and large) for picking objects out of a bin.

In further examples, a 3D model of a stack of boxes may be constructed and used as a model to help plan and track progress for loading/unloading boxes to/from a stack or pallet. Any one actual camera view of the facade may suffer from point of view occlusions and perspective distortion. Accordingly, multiple RGBD views via robot arm movements and/or different views from a base or fixed locations may be combined to create a single facade of the boxes to be picked.

In other examples, the 3D model may be used for collision avoidance. Within examples, planning a collision-free trajectory may involve determining the 3D location of objects and surfaces in the environment. A trajectory optimizer may make use of the 3D information provided by environment reconstruction to optimize paths in the presence of obstacles. In further examples, the optimizer may work in real time and may accept many kinds of constraints. As an example of such a constraint, the optimizer may attempt to keep the end effector level throughout the trajectory.

In additional examples, an environment may be captured as a mesh or set of 3D points. A robot arm may be represented as a convex hull of plane segments for quick collision checking. Constant or frequent updating of the environment may allow the robot arm to quickly respond to changes. In further examples, an optimizer may perform frequent continuous collision checking throughout its path. An optimizer may accept arbitrary constraints in the form of costs, such as to keep a certain distance away from objects or to approach a goal position from a given angle. Additionally, an optimizer may avoid robot fault conditions by working in joint space, keeping track of windup and choosing goal positions from among multiple inverse kinematics solutions. One strategy for motion planning may involve looking ahead several moves to see if the chosen goal joint position will be acceptable for the next move.

In some implementations, path constraints, such as collision avoidance for robotic arms, cameras, cables, and/or other components, may be put in a constraint based planning solver and solved for to yield a best path to move the arm for perception. Additionally, in some implementations, the solver may determine a best path for picking up, moving, and placing an object.

In order to determine a virtual reconstruction of a physical environment of a robotic manipulator, a computing device or system may receive one or more images of one or more objects in the physical environment, such as boxes. The images of the objects may be captured by one or more sensors in sequence at various poses (i.e., positions and orientations) of the sensor(s) and/or of the objects themselves. Thus, respective images may correspond to respective different views of the objects. The images may be of various types, such as color/intensity images, gradient images, and depth map images (i.e., images representative of distances between respective surfaces of the objects and a reference plane associated with a perspective of the sensor(s) that capture the images), among other possibilities. As noted above, the objects may take the form of cuboid-shaped (or other shaped) objects, such as boxes, that are stacked in or otherwise occupy the physical environment, for instance.

In some examples, the one or more images may include various facades of a stack of boxes (i.e., a near-planar group of boxes) from different viewpoints. For instance, when the physical objects are a stacked pallet of boxes in the physical environment, the images may include at least one side view facade of the stacked pallet of boxes, at least one top-down view facade of the stacked pallet of boxes, and/or other variations on these viewpoints (i.e., perspective views). In some implementations, one frontal view or one top view of stacked boxes may be used.

After receiving the one or more images, the computing device or system may virtually reconstruct the physical environment based on the one or more images, a pose of the sensor(s) used to capture the images, and in some scenarios, additionally or alternatively based on other information obtained by sensors such as depth and visual cameras. A reconstruction of the environment may facilitate operations relating to object segmentation, including but not limited to operations described herein. A reconstruction of the environment may be represented, for example, as a point representation, surface representation, or volumetric representation. In one particular example, the computing device may reconstruct the environment in 3D using a volumetric device, such as a Truncated Signed Distance Function (TSDF), which allows for efficient integration of depth images for a wider FOV and lower noise. Generally, the TSDF reconstruction of the environment comprises implicit information about the surfaces present in the volume.

In some examples, a TSDF volume may comprise a regular 3D grid containing a signed scalar field indicating the distance to the nearest depth point. For each depth pixel in an input image, a projected ray may be averaged into the volume, with a zero value in the cell exactly at the 3D position of the depth pixel, where positive values are closer to the camera along the ray, and negative values are further away from the camera. The computing device may integrate together successive depth images that are registered to this volume. In such examples, the computing device may add information from a visual camera as well, in addition to the depth information, as noted above. To facilitate this, the visual camera may be calibrated in accordance with the depth camera, and the depth image may be re-projected to the frame of the visual camera so that their images correspond to the same (visual camera) viewpoint. Then, at cells in the volume along the projecting ray from the depth pixel that lie within a threshold distance from the zero value cell, visual RGB information may also be averaged into the volume cells along the ray.

As a further example aspect of volume reconstruction, each cell may also include information about whether that cell occurs at the edge of the projected depth/visual image. In a scenario where the computing device re-projects the volume to a height map, such information may be used to determine where there are "false edges" in the height map (i.e., edges that arise from the aperture edges of the input images).

As a further example aspect of volume reconstruction, the computing device may take into account a confidence in the depth reading. For instance, readings that are further away from the camera, or that strike a surface at a glancing angle, are discounted by the computing device. As such, more confident information may have more of an effect during integration, which may improve the quality of the environment reconstruction.

In some aspects, the computing device may also subtract information, for example, when an object is removed or the environment changes for any other reason, and when new information contradicts the old information. The TSDF may handle situations such as this by gradually averaging in the new information, which can take a significant number of new views before older, invalid surfaces are removed.

To facilitate quick removing of information, the computing device may implement one or more methods. In a first method, the computing device may have predetermined that it will be loading, unloading, or otherwise interacting with an object such as a box. For instance, the computing device may know a region of the box (e.g., the coordinates and dimensions of the box), and may erase this region from the TSDF volumetric representation, setting the region to a zero state. This erasure may cause errors, and thus, the computing device may gradually smooth the outlines of the removed box. In a second method, the computing device may enforce a strong erasure constraint on each ray that is projected into the volume. Instead of just changing the TSDF volumetric representation in the vicinity of the 3D depth point, the computing device may zero out all cells along the ray, from the camera to a certain distance in front of the 3D depth point. Such a process may cause the environment to change much more rapidly in dynamic situations, without ruining the integration of areas that are stable. Other example methods for quickly removing information from images are possible as well.

In some scenarios, the computing device may need to extract either points or explicit surface information as the input to other algorithms (e.g., obstacle avoidance applications). To facilitate this, the computing device may implement one or more of several different algorithms. For instance, the computing device may project the TSDF volumetric representation onto a planar surface in the form of a height map, the height map being an image whose pixel values represent the distance of the nearest surface along a ray perpendicular to the surface (for orthographic projection), or through a focal point (pinhole projection).

In addition to the height map, the computing device can obtain a similar visual map by projection, since the TSDF volumetric representation contains RGBD values at each cell. Such a visual map may take the same format as the height map. Information in the height map may be color-coded by depth.

In an example application of height maps, the computing device may determine the location of boxes in the physical environment. Every face of a rectangular-sided box may be a planar segment that projects onto an orthographic height map as a parallelogram or other shape. Thus, in order for the computing device to find rectangular box faces, the computing device may look for parallelograms in the height map using line segments from both visual and depth height maps, or using other methods.

As noted above, the TSDF or other 3D volumetric representation of the physical environment may be orthographically projected as height maps (e.g., an X-Y plane height map or a Y-Z plane height map), thereby resulting in a projected color/intensity image, a projected depth image, and a projected normal image of the environment. Some or all of the 3D data points (i.e., 3D point cloud) that make up the volumetric representation may be projected two-dimensionally onto a reference plane associated with the perspective of the sensors that captured the images used for generating the volumetric representation. For instance, the reference plane may be substantially orthogonal to a surface on which the physical objects are placed and/or substantially parallel to a nearby wall or other vertical surface in the physical environment. The reference plane may intersect some or all of the physical objects of the environment, or may be separate from the objects (i.e., behind the objects, such as parallel to a nearby wall). In other examples, the reference plane may be angled and orthogonal to a sightline of one or more of the sensors when the given sensor viewpoint of the facade is a perspective viewpoint.

In some examples of detection and segmentation of physical objects—boxes, in particular—the computing device may identify line, corner, contour and plane features, and use these features in accordance with a method for box hypotheses generation. Such a method may use the orthographic projections of the depth, the normal, and the color/intensity image generated from a 3D virtual reconstruction of an environment. In these orthographic projections, boxes are observed as quadrilaterals, or parallelograms in particular. Such a method may involve operations such as: preprocessing orthographic images, extracting corner features and line features (e.g., line segments) from the preprocessed images, building initial reasonable hypotheses from combinations of line segments, combinations of corners, single planes, and corner-contours, refining the initial hypotheses, filtering out hypotheses with threshold high probability of being associated to a distinct object/surface, removing hypotheses that (i) have more than one plane on which the hypotheses lie on, (ii) contain a significant portion of the background of the physical environment, and (iii) are identical, and performing global reasoning based on assumptions and predictions that a given set of physical objects may not overlap.

Such a method should not be limited to these operations. For instance, some implementations may involve reweighting the probability of box hypotheses based on other detectable features that boxes or other physical objects may include. Other operations are possible as well.

In some implementations, such a method may be divided into different modules which may be processed in successive order. The modules may be associated with one or more of the operations described above. For example, at the first module, a data preprocessing module, all planes which are skewed beyond a given threshold with respect to the one or more optical sensors may be filtered out. A plane associated with the floor on which the boxes are placed may also be filtered out. Then, the computing device may compute a multi-channel edge image for template matching that incorporates the orthographic normal, color/intensity and depth projection image (e.g., normal, color and depth maps) from the reconstructed 3D virtual environment. This may result in a multi-modal gradient orientation image and a corresponding magnitude image. To compute an edge map, the computing device may implement different weighting of the modalities. After computation of the edge map, the computing device may compute all the line, corner, contour, and plane features mentioned above using the normal, color, depth, multi-modal orientation and magnitude images.

At the next module, a box hypothesis generation module, one or more different types of box hypotheses generation approaches may be used. Each approach may use some basic dimension constraint checks initially, which check if a box violates predefined dimensions. If so, that box may be removed. One approach may be box hypothesis by plane feature. In this approach, the computing device may construct a parallelogram that is made up by one plane found within the current scene. If the plane is well explained by the box, and the box is at least partially covered by the plane, that plane may be used as a potential box hypothesis.

In another approach, box hypothesis may be performed using two diagonal opposite corner features. Namely, two diagonal opposite corner features that lie on the same plane may provide all necessary information to build up a parallelogram (by using the corner locations and their respective orientation of their four corner "arms" in total). As such, the computing device may use the underlying gradient orientation and magnitude values to optimize the orientation of the corner arms.

In still another approach, box hypothesis may be performed using two opposite corner features and a contour. Namely, two opposite corner features that lie on the same plane may serve as one baseline. This baseline and the corresponding opposite contour of the plane may serve as two parallel sides of a parallelogram. The other two sides may be provided by the intersection of the corner feature arms which are not incorporated into the baseline and the contour line. The result of the four sides may make up a particular parallelogram. The box hypothesis may consist of one previously detected plane, and may be invalid if there is more than one previously detected plane.

In yet another approach, box hypothesis may be performed using four line features. Namely, four line segments which are approximately perpendicular in 3D may comprise a parallelogram. Each line segment may be required to cover at least a certain percentage of the corresponding border of the resulting parallelogram in order for the computing device to determine that the given box hypothesis is valid. The box hypothesis may consist of one previously detected plane, and may be invalid if there is more than one previously detected plane.

At the next module, a verification and refinement module, the computing device may verify and refine each of the generated box hypotheses based on at least a portion of the available data and known constraints. In one example, the computing device may verify and refine a box hypothesis that was created by two diagonal corner features. In this example, the computing device may create a band around each side of the parallelogram that was created, where every possible line in the band may be evaluated. For each of those lines, the computing device may compute similarity scores (i.e., "verification scores") based on a dot product of the normal of the line and the computed multi-modal gradient noted above. Finally, the computing device may select one parallelogram out of all possible parallelograms where the sum of the similarity scores is maximal under all parallelograms. If the best parallelogram is above a certain threshold, the computing device may process it further. Otherwise, that parallelogram may be rejected. This similarity score may be used later as a confidence score during global reasoning.

In another example, the computing device may verify and refine a box hypothesis that was created by a plane. In this example, the computing device may apply the same verification score method as noted above with respect to the previous example. However, all box hypotheses that are rejected may not be discarded, but rather still used with a low confidence value.

In still another example, the computing device may verify and refine a box hypothesis that was created by two opposite corner features and a contour. First, the computing device may optimize the baseline by computing every possible line within a band around the baseline and using the line which is best supported by the data (as in the first verification example). Next, the computing device may project a location of the two corner features onto the optimized baseline in order to obtain a start and an end point. Then, the computing device may use that line and the corresponding normal of the underlying plane to recompute the orientation of the template arms (i.e., the segments extending from each corner). The intersection of the two new template arms and the contour may serve as two adjacent lines to the baseline. Both of those adjacent lines may also be refined (similar as the baseline). Their average intersection with the contour gives a parallelogram. The confidence value of this refined box is the similarity score of the baseline and the two adjacent lines. Using this method of verification, the computing device may reject such a refined box if the similarity score is too low or the fourth line is not much supported by the contour pixels (i.e. the contour pixels are too far away from the constructed fourth line). This similarity score may be used later as a confidence score during global reasoning.

In yet another approach, the computing device may verify and refine a box hypothesis that was created by four line segments. Here, the method of verification and refinement may be the same as the method for verification and refinement of a box hypothesis that was created by two diagonal corner features. The computing device may determine whether the refined box hypothesis violates predetermined "box dimension constraints" and/or the perpendicularity of the box dimension constraints. Each box may have three different side lengths (e.g., a height, width, and depth), and the "box dimension constraints" refer to lengths of two of these sides that are included in a given box hypothesis. As such, the computing device may determine that a box hypothesis does not violate the box dimension constraints if (i) the lengths of the two sides fall within a predetermined range of lengths associated with the predetermined box dimension constraints (e.g., predetermined based on a multitude of known, different boxes) and/or (ii) the two side lengths substantially match one or more predetermined box dimension constraints. Thus, the only detected box hypotheses that may be considered are box hypotheses that have a given combination of side lengths that (i) are not too small or too large and (ii) substantially match predefined box sizes. If the computing device determines that a refined box violates such constraints, the corresponding box may not be further considered.

At the next module, a background and plane coverage check module, in order to check consistency of all box hypotheses, the computing device may determine whether each box hypothesis covers a significant part of the background and/or more than just one plane. As such, boxes that cover a significant part and/or more than just one place are removed from consideration.

At the next module, an identity check module, the computing device may remove duplicate box hypotheses in order to speed up global reasoning. Namely, the computing device may remove exact duplicates and also may remove box hypotheses which are substantially close to other box hypotheses.

At the last module, a global reasoning module, the computing device determines a more clear interpretation of a given facade. By implementing this module, the computing device can avoid overlapping box hypotheses in the final box detection results. First, however, the computing device may perform local reasoning. Namely, the computing device may determine, for each box hypothesis, whether there is a significant smaller box hypothesis that intersects this box hypothesis and whose depth-only similarity score is high enough to assume that the smaller box hypothesis is an actual box. When there is such a significant smaller box hypothesis, the computing device may determine that the larger box hypothesis is not an actual box and remove it from consideration.

For the global reasoning aspect, the computing device may first extract connected groups of box hypotheses where a box hypothesis belongs to one group if it occludes another box hypothesis within the group or is occluded by another box hypothesis within the group. Each box hypothesis may only belong to one group. For each group the computing device may build a connected undirected graph where two nodes are connected if the two corresponding box hypotheses don't overlap. The computing device may then attempt to find maximal cliques with this graph (i.e., subgraphs where each node (e.g., a box) is connected to all other nodes (e.g., other boxes)). Each clique may be weighted by factors such as the confidence scores of the included box hypotheses, the area of the box hypotheses (e.g., a number of pixels included in the box hypothesis), and the number of box hypotheses that belong to this clique (larger number means higher weighting). For instance, the weight (or "final confidence score") may equal a product of each of those factors. Lastly, the computing device may determine a sorting of all the weighted maximal cliques in decreasing order, and then use the one with the maximum score as a final global result for virtually distinguishing distinct objects in the images. Other examples of segmentation of physical objects are possible as well.

Operations relating to distributing requests for remote assistance will now be discussed in more detail. Such operations may be used in addition to, used as an alternative to, and/or may modify one or more of the operations described above.

Figure 3:
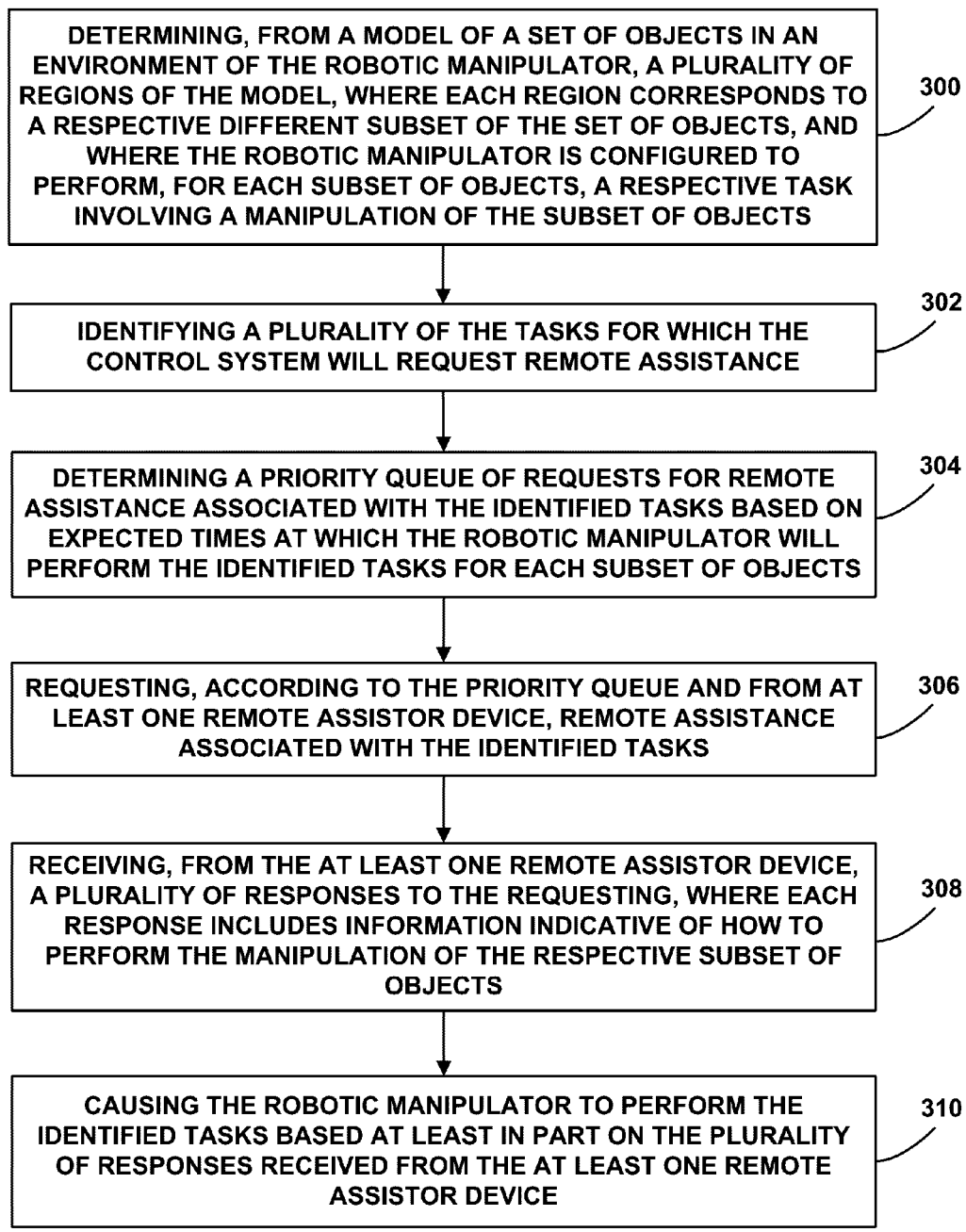
FIG. 3 is a flow chart of an example method, in accordance with at least some implementations described herein.

FIG. 3 is a flow chart of an example method for distributing remote assistance in order to facilitate robotic object manipulation. The method shown in FIG. 3 presents an implementation of a method that, for example, could be used with the systems shown in FIGS. 1A-2C, for example, or may be performed by a combination of any components of in FIGS. 1A-2C. In addition, such an implementation of a method could be carried out in accordance with the systems and aspects illustrated in FIGS. 4, 5, 6, 7, and 8. The method may include one or more operations, or actions as illustrated by one or more of blocks 300-310. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method and other processes and methods disclosed herein, the flowchart shows operation of one possible implementation of present implementations. In this regard, each block may represent a module, a segment, or a portion of program code, which includes one or more instructions executable by one or more processors for implementing specific logical operations or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method and other processes and methods disclosed herein, each block in FIG. 3 may represent circuitry that is wired to perform the specific logical operations in the process.

Operations of this example method, and operations of other methods and processes disclosed herein, may be performed at least in part by a computing device or computing system configured to control a robotic device and/or other components (e.g., sensors or another type of robotic vision system located remotely from the system) that are associated with the robotic device. For instance, operations of the method may be performed by one or more global control systems, each configured to control and manage at least one robotic device. Additionally or alternatively, operations of the method may be performed by a cloud computing system in communication with a global control system and/or with one or more robotic devices. Additionally or alternatively, operations of the method may be managed by a central server, which can distribute operations to smaller networks or servers that may each manage one or more robotic devices. Some operations of the method may also be described to be performed by a robotic device itself, although such language may refer in actuality to such operations being performed by a control system configured to control the robotic device.

At block 300, the control system determines, from a model of a set of objects in an environment of the robotic manipulator, a plurality of regions of the model, where each region corresponds to a respective different subset of the set of objects, and where the robotic manipulator is configured to perform, for each subset of objects, a respective task involving a manipulation of the subset of objects. Herein, a "model" refers to an n-dimensional virtual reconstruction of a physical environment, such as the physical environment of the robotic manipulator that includes the set of objects. Within examples, the model may be a 3D volumetric model of the set of objects. Within additional examples, the model may be a 2D image of a façade of the set of objects, such as an orthographically-projected color/intensity image, depth image, or normal image, or another type of 2D image.

In line with these examples, each region of the model may be a virtual representation that corresponds to a subset of the objects. For instance, each determined region may include one or more determined object hypotheses (e.g., a box hypothesis, as described above) that the control system expects to correspond to a subset of one or more objects. Within examples, a given subset of objects may include a single object or may include multiple objects. For instance, in some scenarios, it may be advantageous to request remote assistance with a subset of one or two objects so that the human assistor can analyze the request and respond more quickly. Within additional examples, a given subset of objects may include a portion of a single object rather than an entire single object; such a subset of objects may be intentionally determined by the control system or may be determined as a result of the control system mistakenly detecting one or more objects in a region of the model where, in actuality, the region includes only a portion of an object. Likewise, the control system may detect multiple objects in a region where, in actuality, the region includes only one object. Each subset may include the same amount of objects, or at least one subset may include a different number of objects than another subset.

Figure 4:
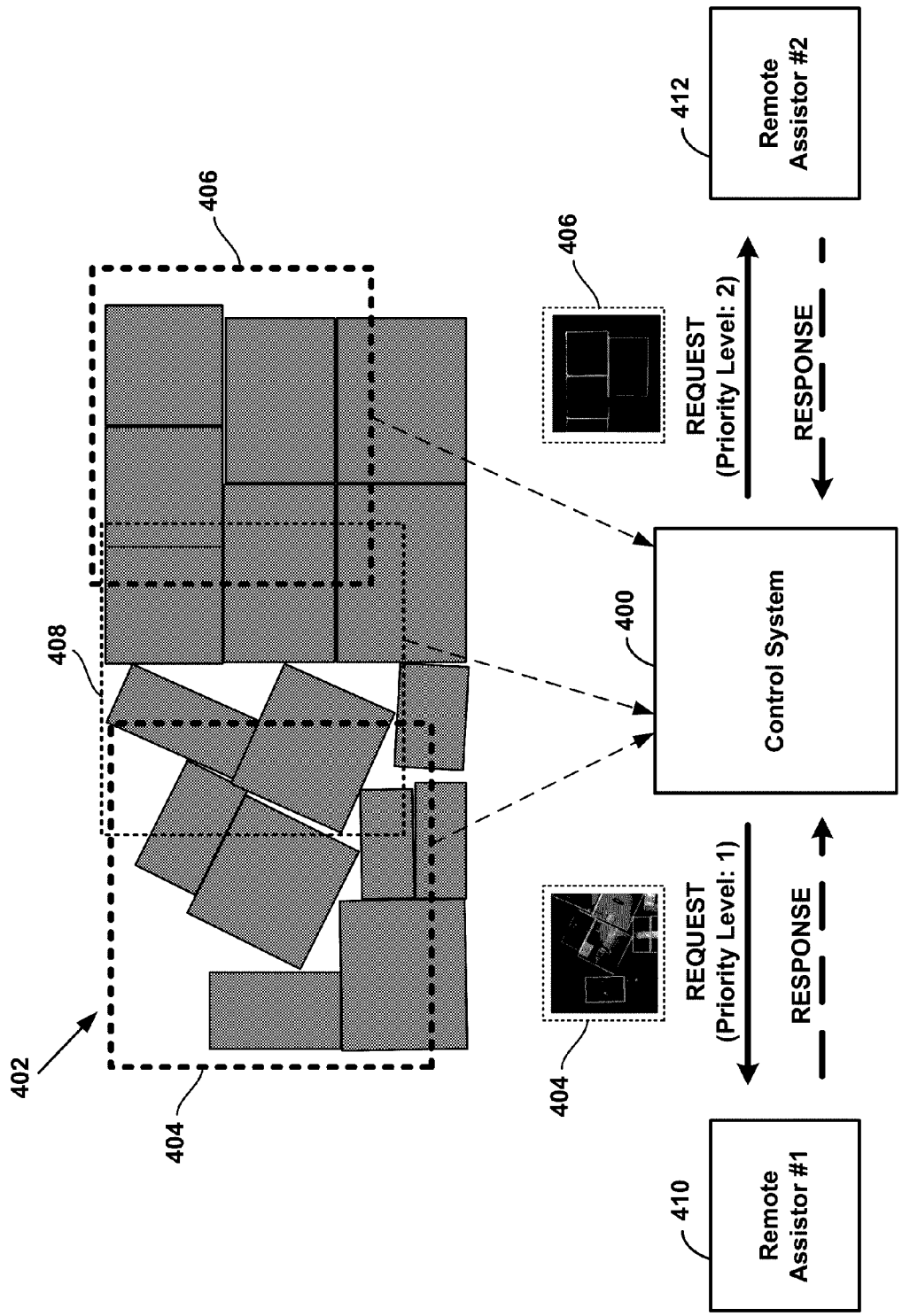
FIG. 4 illustrates an example control system and example remote assistor devices, in accordance with at least some implementations described herein.

FIG. 4 illustrates an example system in which operations of the example method can be performed, in accordance with at least some implementations described herein. As shown in FIG. 4, the control system 400 may determine a model 402 of the set of objects, namely, a 2D image of a façade of boxes. The control system may thereby determine a plurality of regions of the model 402 that each correspond to a subset of objects, such as region 404, region 406, and region 408. In particular, region 404 corresponds to various boxes that are tipped over and leaning on other boxes, region 406 corresponds to boxes that are stacked neatly, and region 408 corresponds to some boxes that are tipped over and other boxes that are stacked neatly. As shown, these regions overlap, but may not always overlap in practice. Further, as discussed above, the robotic manipulator (not shown) and/or the control system may be configured to perform, for each subset of objects included in each region, a respective task involving a manipulation of that subset of objects.

Herein, a "task" refers to an operation that is assigned to at least one entity for that entity or entities to perform. Such a task may be assigned to the at least one entity by a system that monitors, governs, or otherwise manages the at least one entity in order to facilitate a performance of the task by the at least one entity. The system could also assign the task to itself. Consequently, the at least one entity may perform the task entirely on its own or may perform the task in conjunction with the system that assigns the task. In line with the example method, for instance, the control system may assign a task to the robotic manipulator for the robotic manipulator to perform on its own or in conjunction with the control system.

Within examples, a given task may involve the control system determining a segmentation of the respective subset of objects and then instructing the robotic manipulator to perform the manipulation of the respective subset of objects based on the determined segmentation. In some examples, the control system may segment one or more subsets of objects before a given task is assigned and/or as part of the performance of the given task, since the segmentation of those subsets may enable the control system and/or the robotic manipulator to perform the given task (e.g., determine a segmentation of the subset so as to distinguish the object(s) of the subset, and then use that segmentation to identify other information about the object(s), label the object(s), grab and move the object(s), etc. based on the segmentation).

Within additional examples, a given task may involve the control system identifying one or more locations on each object of a respective subset of objects (e.g., before or during the segmentation of the respective subset) and then instructing the robotic manipulator to grip or otherwise interact with the respective subset of objects at the identified one or more locations. For instance, the robotic manipulator may couple its gripper to each individual object at one or more locations, a forklift robotic manipulator may insert its forks into one or more locations on a pallet of objects so as to lift the pallet, among other possibilities.

Within additional examples, a given task may involve the control system determining a sequenced order in which to perform the manipulation of each object of the respective subset of objects and then instructing the robotic manipulator to manipulate the subset of objects in the determined order. For instance, after/while/without segmenting the subset of objects in the region, the control system may label each object with a number that indicates which object the control system will instruct the robotic manipulator to manipulate first, second, third, etc.

Within additional examples, a given task may involve the control system identifying a virtual boundary line separating two adjacent objects of the respective subset of objects and then instructing the robotic manipulator to perform the manipulation of the respective subset of objects based on the identified virtual boundary line. For instance, during or separate from the process of segmenting a respective region of a subset of boxes, the control system may identify a virtual boundary line (e.g., a corner of a box and/or an edge of a box) separating what the control system perceives to be two adjacent boxes in the region.

Within additional examples, a given task may involve the control system identifying one or more locations in the environment of the robotic manipulator the control system should place the respective subset of objects and then instructing the robotic manipulator to place each object at the identified one or more locations. For instance, the control system may determine a model of an environment, such as a truck or pallet, in which a subset of boxes are to be placed, identify one or more regions in the model that correspond to one or more locations in the truck or on the pallet where the control system is planning to place (e.g., load) each object, and then cause the robotic manipulator to place each object at the one or more locations in the truck or on the pallet. Further, the control system may also determine a sequenced order in which to place the respective subset of objects and then cause the robotic manipulator to place each object at the identified one or more locations in a determined sequenced order.

Within additional examples, a given task may involve the control system determining a path along which the robotic manipulator (or another type of robotic device) should move (e.g., drive, slide, rotate, etc.) in order to manipulate a subset of objects and/or should move while manipulating a particular object (e.g., a path along which the robotic manipulator should carry and place the particular object). For instance, the control system may determine a path along which a robotic device should travel across the workplace floor in order to arrive at the subset of objects. The control system could also determine a path along which a forklift may move its forks to one or more locations on a pallet of objects at which the forklift will lift the pallet of objects. Other types of paths are also possible.

Other tasks are possible as well. The tasks described above and/or other tasks may be performed in combination with one another or separate from one another. Furthermore, the control system and/or the robotic manipulator may be assigned the same task for each region of the model (e.g., a task involving a segmentation of each region), or at least one task may be different from another task (e.g., determine a sequenced order in which to manipulate a subset of objects in one region, but do not determine a sequenced order for another region).

As discussed above, in some scenarios the control system may require or otherwise prefer remote assistance with the performance of a plurality of tasks (e.g., when performance of a particular task is not trivial). For instance, the control system may be unable to perform at least a portion of the given task (e.g., the control system can segment a subset of objects but cannot determine a sequenced order), may determine incorrect information associated with the given task (e.g., may determine an incorrect or less-than-optimal sequenced order), and/or may be uncertain as to whether the information it has determined is sufficient for enabling the robotic manipulator to manipulate objects in the desired manner (e.g., may determine a segmentation with one or more object hypotheses with low confidence scores).

Accordingly, referring back to FIG. 3, at block 302, the control system identifies a plurality of the tasks for which the control system will request remote assistance. As such, the term "identified task" may refer herein to tasks that have been identified as a task for which the control system will request remote assistance.

Such an identification may be based on various factors. By way of example, the control system may determine, for each region, a confidence score associated to that region, and may identify the plurality of tasks based at least in part on the confidence scores determined for each region. A confidence score may indicate a level of confidence in how to perform the respective task involving the manipulation of the subset of objects of the respective region, and may take the form of a number value (e.g., one through ten, 0% through 100%, etc.) or another type of data representation, either visual or non-visual. Within examples, based on the associated region and task, the confidence score may indicate a level of confidence in how to determine a segmentation that distinguishes boundaries of the subset of objects of the respective region (e.g., a confidence score value of a determined box hypothesis, as described above), a level of confidence in how to identify the one or more locations on each object of the respective subset of objects, and/or a level of confidence in how to determine the sequenced order in which to perform the manipulation of each object of the respective subset of objects, among other possibilities.

Within examples, if the control system determines that a confidence score associated to a given region is lower than a predetermined confidence threshold, the control system may identify that the respective task for the given region is a task for which the control system will request remote assistance. On the other hand, if the control system determines that a confidence score associated to a given region is greater than the predetermined confidence threshold, the control system may not request remote assistance with the respective task for the given region. Alternatively, the control system may request remote assistance when the respective confidence score is greater than a predetermined threshold and may not request remote assistance when the respective confidence score is lower than the predetermined threshold.

Within examples, the control system may have stored a predetermined confidence threshold for each type of task. Alternatively, within other examples, the control system may have stored a global predetermined confidence threshold to be used for each type of task. Within additional examples, the control system may have stored a predetermined confidence threshold for one or more characteristics of objects that could be detected in the environment. For instance, when a particular lighting, particular object color, etc. is present and detected by the control system, the control system may determine that it should use a predetermined confidence threshold associated with that characteristic when determining if it will request remote assistance for performing the respective task involving a manipulation of a subset of objects with that characteristic.

Furthermore, each predetermined confidence threshold may be adjusted automatically or manually. For instance, a predetermined confidence threshold may dynamically decrease as the control system has been trained to perform tasks with higher confidence and greater precision and accuracy, based on repeated interaction between the control system and the remote assistor devices. Additionally or alternatively, a human user may provide instructions for the control system to adjust a predetermined confidence score.

Once the control system has identified the tasks for which it will request remote assistance, the control system can determine how to distribute the requests to remote assistor devices and then begin distributing the requests accordingly. At block 304, the control system determines a priority queue of requests for remote assistance associated with the identified tasks based on expected times at which the robotic manipulator will perform the identified tasks for each subset of objects. Then, at block 306, the control system requests, according to the priority queue and from at least one remote assistor device, remote assistance associated with the identified tasks.

Herein, a "queue" refers to data that is stored in memory accessible by the control system in order for the control system to access/remove data that is stored. In practice, some data may be stored in the queue with higher priority than other data, and thus the data with higher priority may be accessed/removed before data with lower priority. However, in some scenarios, two or more portions of data (e.g., requests for remote assistance) may have the same priority and thus may be accessed/removed from the priority queue at substantially the same time.

Herein, the term "requesting," or "request," refers to data transmitted from a first entity (e.g., the control system) to a second entity (e.g., a remote assistor device) that indicates a request for the second entity to provide the first entity with data associated with the request. Consequently, in some examples, the first entity may also provide additional data as part of the request (or separate from the request) that the second entity can use to (i) determine what type of data the second entity should send in response to the request and/or (ii) determine when the second entity should provide a response to the request. Furthermore, the operation of "requesting" may refer herein to the process of sending out a request for each identified task, or may refer to sending a single message that includes the requests for remote assistance with each identified task.

Within examples, the control system may determine the priority queue by assigning a priority level to each identified task for which the control system will request remote assistance. The priority level may be based on the expected times at which the control system will perform the identified task. For instance, if the control system expects (e.g., estimates or determines) that the robotic manipulator will perform a first identified task involving a manipulation of a first subset of objects before performing a second identified task involving a manipulation of a second subset of objects, the control system may assign a higher priority level to the first identified task and assign a lower priority level to the second identified task. As a more specific example, if the control system expects that it will need to cause the robotic manipulator to unload detected boxes on the top of a pallet before unloading detected boxes on the bottom of the pallet, the control system may assign a higher priority level to the task of detecting boxes on the top of the pallet and may assign a lower priority level to the task of detecting boxes on the bottom of the pallet. Generally, in practice, the control system may assign priority levels based on how soon the robotic manipulator will manipulate objects that are being detected, part of a determined sequenced order, etc. because the robotic manipulator can more easily and more quickly manipulate objects that are unobstructed by other objects.

Within examples, the priority levels may dictate to the control system the times at which the control system will send out the requests for remote assistance with the identified tasks. Accordingly, the control system may determine the priority queue by rank-ordering the requests in order of the expected times at which the robotic manipulator will perform each of the identified tasks so as to define a particular order in which the control system will send out the requests, and the control system will then send out the requests in the particular order. For instance, if the control system plans to perform a first identified task (e.g., determining a sequenced order in which to pick up and move each object in a first subset of objects) before performing a second identified task (e.g., determining a segmentation of a second subset of objects), the control system may (i) assign a higher priority in the queue for a first request for remote assistance with the first identified task, (ii) assign a lower priority in the queue for a second request for remote assistance with the second identified task, and then (iii) send out the first request before sending out the second request.

Additionally or alternatively, within other examples, the priority levels may dictate to the control system when responses to the requests will be processed (i.e., when the control system will use the data included in the response as a basis for instructing the robotic manipulator how to perform the identified task). Accordingly, regardless of what order the control system sends out the requests for remote assistance (at different times or all at the same time), the priority levels assigned to the requests in the priority queue may indicate to the control system a particular order in which the control system will process responses to the requests and thereby cause the robotic manipulator to perform the identified task in accordance with the processed responses. For instance, if the control system plans to perform a first identified task before performing a second identified task, the control system may not process a response to the second request for remote assistance with the second identified task until after the control system has processed a response to the first request for remote assistance with the first identified task.

The priority levels may define/dictate other information to the control system as well.

Within additional examples, regardless of what the priority level dictates, the request may include an indication of the priority level. As such, when a remote assistor device receives the request, the remote assistor device may responsively display the priority level or otherwise notify the human user of the remote assistor device of the priority level. Additionally or alternatively, the request may include an indication of a specific expected time at which the control system and robotic manipulator will perform the identified task and/or a specific time at which the control system and robotic manipulator would like to (or needs to) receive the response from the remote assistor device (e.g., a deadline). For instance, the remote assistor may interpret data received in a request that instructs the remote assistor device to display the message "Priority level: High. Please respond in one minute," and perhaps additionally instructs the remote assistor device to display a timer that counts down, so that the human user can monitor how much time they have left to respond.

It should be understood that, within other examples, the priority levels assigned to each identified task may be based on other factors as well, in addition to or alternative to being based on expected times at which the robotic manipulator will perform each of the identified tasks. For instance, the priority levels may be based on how far away the subset of objects are from the robotic manipulator, whether the identified task involves manipulation of fragile objects (e.g., sending a request related to fragile objects before sending requests related to non-fragile objects in order to allow the robotic manipulator more time to carefully manipulate the fragile objects after receiving a response to the request for human assistance), among other possible factors. Within other examples, it is possible that the requests may be stored in the queue in a random order, the requests may be sent out in a random order, and/or the responses to the requests may be processed in a random order.

As discussed above, instead of the control system sending out requests for remote assistance with larger-scale identified tasks involving a manipulation of the entire set of objects in the model, the control system may divide the model into smaller regions (i.e., the operations at block 300) and send out requests pertaining to identified tasks for the respective subset of objects in certain regions. By this process, human assistors would not need to see the entire workspace and may be enabled to provide more efficient and timely feedback for a region including a smaller number of objects (e.g., one or two objects) than would have been possible for a region including a larger number of objects. Thus, the control system can more efficiently receive and use human feedback to manipulate objects in the workspace.

In one implementation of the example method, the control system may send each request of the plurality to the same remote assistor device, possibly in a particular, prioritized order. In such an implementation, the remote assistor device at issue may receive each request from the control system and may also receive additional information indicative of a requirement to respond to the requests in a particular, prioritized order (e.g., a requirement to respond to higher-priority requests before responding to a lower-priority request). Additionally or alternatively, the control system may process the response to each request in a particular, prioritized order, regardless of the order in which the control system sent the requests to the remote assistor device.

In another implementation of the example method, the control system may send, in parallel, each request of the plurality to multiple different remote assistor devices. As noted above, the control system may send the requests in a particular, prioritized order and/or process the response to each request in a particular, prioritized order, regardless of the order in which the control system sent the requests to the multiple remote assistor devices. Such an implementation may enable the control system to even more efficiently receive and use human feedback to manipulate objects in the workspace because a pool of human assistants would be handling multiple requests at once, in parallel. Additionally or alternatively, in a variation of this implementation, the control system may send a given request of the plurality to multiple different remote assistor devices. Consequently, the control system can then receive, from the multiple different remote assistor devices, multiple responses to the given request, and the control system can then consider all of the received responses when determining how to perform the identified task based on the received responses (e.g., compare the responses, aggregate the responses, etc.). This variation may be desirable in some scenarios. For instance, it may be advantageous for the control system to request multiple human assistants to review the segmentation because some human assistants may notice mistakes that the control system made that other human assistants do not notice (e.g., when the control system determines a very low confidence level for its segmentation of a subset of objects).

Referring again to the example system of FIG. 4, the control system 400 may divide the model 402 into at least three regions: region 404, region 406, and region 408. The control system may also identify two tasks for which the control system will request remote assistance. In particular, the control system may request remote assistance with segmenting (i.e., determining/verifying box hypotheses for) the subset of boxes in region 404 in order to enable the control system to cause the robotic manipulator to grip and move each box in the subset of boxes in region 404. Likewise, the control system may also request remote assistance with segmenting the subset of boxes in region 406 in order to enable the control system to cause the robotic manipulator to grip and move each box in the subset of boxes in region 406. The control system could also request remote assistance with another identified task with respect to the subset of boxes included in region 408 as well, but for the sake of example, it will be assumed that the control system can segment the boxes in region 408 with a high confidence level and thus will not need to request remote assistance with the segmentation of region 408.

After identifying the tasks, the control system 400 may determine the priority queue. For instance, the control system may determine that because the boxes in region 404 are tipping over, the control system should cause the robotic manipulator to pick up and move those boxes before picking up and moving the boxes in region 406, since the boxes in region 404 might fall over if the boxes in region 406 are moved. Thus, the control system may assign a higher priority level (e.g., "Priority Level: 1" as shown in FIG. 4) to the identified task of segmenting region 404 and assign a lower priority level (e.g., "Priority Level: 2" as shown in FIG. 4) to the identified task of segmenting region 406. The control system may also determine that it should cause the robotic manipulator to pick up and move the tipped-over boxes in region 408 before picking up and moving the boxes in region 406 and one of the other boxes in region 408, but will not require remote assistance with segmenting the subset of boxes in region 408 as noted above.

As shown, the control system may then send, to a first remote assistor device 410, a request for remote assistance with segmenting region 404 and send, to a second remote assistor device 412, a request for remote assistance with segmenting region 406. In line with the discussion above, the control system may send the two requests from the priority queue in a particular order based on the priority levels the control system assigned to each request. For instance, the control system may send the request for remote assistance with segmenting region 404 before sending the request for remote assistance with segmenting region 406. Additionally or alternatively, the control system may be configured to process the request for remote assistance with segmenting region 404 before processing the request for remote assistance with segmenting region 406, based on the assigned priority levels.

Within examples, the control system may include in each request an indication of the control system's determined confidence level for performing the identified task. Within additional examples, the control system may include in each request an indication of the respective region associated to the respective identified task, which may enable the human user to more efficiently assist with the respective identified task. For instance, the control system may include, in a given request, data that, when processed by a remote assistor device, causes the remote assistor device to display a graphical user interface (GUI) including graphical elements representative of the respective region. Accordingly, the remote assistor device may include a user input device, such as a touchscreen, keyboard, mouse, etc., that the human user can use to interact with the GUI and provide assistance with the respective identified task.

The graphical elements may include static and/or adjustable elements, and may vary based on the type of identified task for which the control system requested remote assistance from the remote assistor device. For instance, a static element may include a background of a façade of boxes in the region, a visual representation of the control system's confidence level for performing the identified task, a box hypothesis that the control system has determined with a high confidence level, etc. Adjustable elements may include, for instance, one or more virtual boundary lines (e.g., corners, edges) of box hypotheses that the control system may have determined with a low confidence level. For example, the control system may have correctly determined the locations of three edges of a box hypothesis, but may have incorrectly determined the fourth edge of the box hypothesis. As such, each of the determined edges may be visually presented to the human user as graphical elements on the remote assistor device and the human user may be able to move the fourth edge to the correct corresponding location in the region and "snap" the fourth edge to one of the correctly-determined edges. As another example, the control system may determine a gripping location on a particular box in the region at which the robotic manipulator will manipulate the particular box. As such, the gripping location may be visually presented to the human user as a graphical element on the remote assistor device and the human user may be able to move the gripping location to a more preferable position on the particular box. As yet another example, the control system may determine a path along which the robotic manipulator should move in order to engage in the manipulation of a particular box. As such, the path may be visually presented to the human user as a graphical element on the remote assistor device and the human user may be able to adjust the path. Other examples are possible as well.

Within additional examples, the human user may be able to create new graphical elements and/or delete graphical elements in addition to or alternative to adjusting elements. For instance, the human user may be able to use a touchscreen of the remote assistor device to "draw" a box hypothesis around a box or other object that the control system did not detect. The human user may also be able to create labels (e.g., numbers) that the human user can assign to each object in the region when determining a sequenced order in which the robotic manipulator should manipulate the objects. Other examples are possible as well.

Referring back to FIG. 3, at block 308, the control system receives, from the at least one remote assistor device, a plurality of responses to the requesting, where each response includes information indicative of how to perform the manipulation of the respective subset of objects. Then, at block 310, the control system causes the robotic manipulator to perform the identified tasks based at least in part on the plurality of responses received from the at least one remote assistor device. In particular, the control system may cause the robotic manipulator to perform a given identified task by sending instructions to the robotic manipulator that include the information received in one or more responses associated with the given identified task indicative of how to perform the given identified task.

The information indicative of how to perform the manipulation of the respective subset of objects may include information representative of any human user feedback determined by the remote assistor device based on human user input, such as (i) a user-determined box hypothesis, (ii) a user-determined sequenced order in which to manipulate the subset of objects, (iii) a user-determined location on each of the subset of objects where the robotic manipulator should manipulate each object, (iv) an indication of user acceptance of a control system-determined segmentation of the subset of objects, (v) an indication of user rejection of a control system-determined segmentation of the subset of objects, and/or (vi) an instruction for the control system to rescan the subset of objects or the entire set of objects, among other types of labels/information associated to the subset of objects.

As noted above, the control system may maintain and adjust records associated with remote assistor devices and/or human users that operate such remote assistor devices. In particular, the control system may use responses received from the remote assistor devices and the resulting performance of identified tasks as a basis for determining and adjusting such records to reflect increases and decreases in the usefulness of feedback from each of the remote assistor devices. For instance, such records may include remote assistor ratings, or other task performance statistics, that indicate whether the robotic manipulator has correctly performed identified tasks based on information included in each of the responses that the control system has received from the remote assistor device (e.g., responses provided by human users operating the remote assistor devices) for those identified tasks.

Remote assistor ratings and other task performance statistics may represent human assistor performance at various levels of granularity. Within examples, the given remote assistor device's remote assistor rating may be 50%, which indicates that control system receives feedback from the remote assistor device that causes the robotic manipulator to correctly perform identified tasks 50% of the time (e.g., a 50% success rate). Within additional examples, the control system may (i) maintain a running total of how many objects the robotic manipulator has correctly manipulated in accordance with identified tasks, based on responses that the control system has received from the remote assistor device, and (ii) determine the remote assistor device's remote assistor rating based on the running total of objects.

Within additional examples, task performance statistics may indicate a percentage of each type of identified task the robotic manipulator has correctly performed based on information included in responses received from the remote assistor device. For instance, if the robotic manipulator performed only 20% of an identified task based on a response from the remote assistor device (e.g., in a subset of five boxes, the human user correctly identified one box hypothesis and incorrectly identified four other box hypotheses) and 20% is below a predetermined threshold task-completion percentage, the control system may lower the remote assistor device's remote assistor rating.

Within additional examples, task performance statistics may indicate an amount of time taken by the robotic manipulator to perform each identified task based on the information included in the responses received from the remote assistor device. For instance, if the robotic manipulator performed an identified task correctly, but took longer than a predetermined threshold amount of time to perform the task (e.g., due to an incorrect box hypothesis identified by the human user, due to a sequenced order determined by the user that caused boxes to fall down, etc.), the control system may lower the remote assistor device's remote assistor rating.

Within additional examples, task performance statistics may indicate an amount of time taken by the human user to provide a response via the remote assistor device to the control system. For instance, if the human user exceeded a predetermined threshold amount of time and took too long to provide assistance with an identified task in a timely manner, perhaps impeding robotic operation by causing the identified task or other identified tasks to be performed incorrectly or performed later than expected, the control system may lower the remote assistor device's remote assistor rating. The remote assistor ratings and other task performance statistics may take other forms as well, and the control system may also be configured to increase a user's/device's task performance statistics and ratings based on performance data exceeding the thresholds discussed above.

The control system may use remote assistor ratings and other task performance statistics in various ways. Within examples, the control system determining the priority queue may involve the control system assigning requests to certain remote assistor devices based on task performance statistics. For instance, the control system may assign at least one request to a given remote assistor device based on a predetermined remote assistor rating of the remote assistor device that indicates a history of whether the robotic manipulator has correctly performed previous tasks based on feedback that the control system has received from the remote assistor device. Additionally or alternatively, the control system may assign a request to a given remote assistor device based on the identity of the human user that will be operating the given remote assistor device and handling the request. Accordingly, the control system may request the human user to identify themselves when operating a remote assistor device that will be receiving requests for remote assistance. The control system may then assign at least one request to a given remote assistor device based on the predetermined remote assistor rating of the human user that will be operating the given remote assistor device. More particularly, the control system may determine that a human user's predetermined remote assistor rating exceeds a predetermined threshold and then assign a request to a given remote assistor operated by the human user based on that determination.

Within additional examples, the control system may use remote assistor ratings and other task performance statistics as competition statistics in a game-like scenario. For instance, in some implementations of the example method, human users operating multiple remote assistor devices in a local network (e.g., local to a warehouse) and/or a wider-area network (e.g., across multiple warehouses, across a particular corporation, statewide, nationwide, worldwide, etc.) may compete against each other to provide the most helpful and timely responses to remote assistance requests received from the control system and/or other control systems. In such implementations, the control system may locally and/or globally rank human users based on their task performance statistics and provide notifications to each remote assistor device so that each human user can see the task performance statistics of other human users.

In some implementations, a game-like scenario may be collaborative rather than competitive. In such implementation, the control system may instruct each remote assistor device from which the control system will request remote assistance to provide for display a collaborative user interface that enables each human user to monitor the status and progress of each other human user and/or each robotic device in the workplace. The collaborative user interface may include a variety of elements to enable collaboration. For example, the collaborative user interface may include a video feed of one or more robotic devices. As another example, the collaborative user interface may provide a visual indication of other robotic devices' progress in performing one or more tasks in the workplace. As yet another example, the collaborative user interface may include a chat window in which human users can send text messages, voice messages, video messages, and/or other means of communication to each other. As such, each remote assistor device may include a means for providing communication between remote assistor devices, such as a touchscreen, keyboard, camera, microphone, and/or other user input device.

A collaborative game-like implementation of the operations described herein may have various advantages. Generally, when multiple tasks necessitate remote assistance, human users can work together in an orchestrated fashion to cause one or more robotic devices in the workplace to perform the tasks and/or perform various intermediate phases of each task. In an example implementation, one human user may provide remote assistance to control an autonomous palletjack (e.g., forklift) to navigate a warehouse environment, while another human user provides remote assistance to control a robotic device that removes an obstacle in the palletjack's (or other robotic device's) way, while yet another human user provides remote assistance to control another robotic device that opens a loading dock to which the palletjack can bring pallets of objects, and while yet another human user provides remote assistance to control a drone with a camera in order to supervise robotic activities in the warehouse. Other examples are possible as well.

Figure 5:
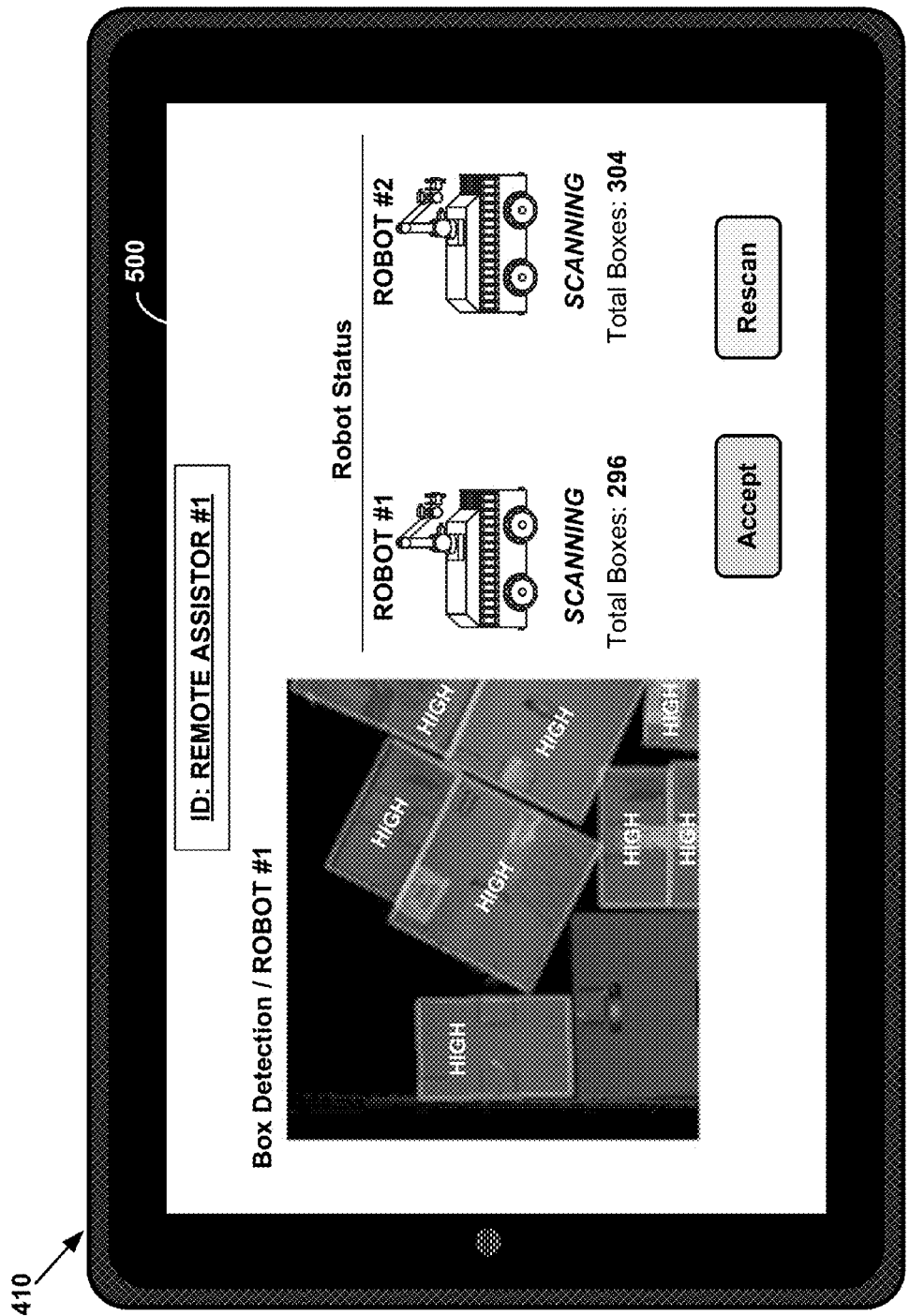
FIG. 5 illustrates an example interface of a remote assistor device, in accordance with at least some implementations described herein.

The manner in which remote assistor devices can provide information to human users for facilitate responses to remote assistance will now be illustrated in more detail. FIG. 5 illustrates an example interface of a remote assistor device, in accordance with at least some implementations described herein. In particular, FIG. 5 illustrates the first remote assistor device 410 of FIG. 4, which received a request for remote assistance with segmenting region 404, as noted above. The first remote assistor device is shown as a tablet computing device with a touchscreen GUI 500. The GUI includes an indication of the identified task for which the control system 400 requested remote assistance (e.g., "Box Detection"), an indication of a user identifier of the human user operating the first remote assistor device (e.g., "REMOTE ASSISTOR #1"), as well as an indication of which robotic device in the workplace will be performing at least a portion of the identified task (e.g., "ROBOT #1"). In this case, ROBOT #1 will pick up the boxes of region 404.

The GUI 500 also includes a visual representation of region 404, box hypotheses that the control system determined for region 404, and confidence "scores" associated with various box hypotheses (e.g., "HIGH"). Further, the GUI includes an option for the human user to either "Accept" the box hypotheses determined by the control system for region 404 or instruct the control system to "Rescan" and thereby determine new box hypotheses (e.g., by rescanning the entire set of boxes 402 or merely rescanning the subset of boxes in region 404). Still further, the GUI includes a "Robot Status" portion, which identifies ROBOT #1 and other robotic devices (e.g., "ROBOT #2") that may be operating in the same workplace or other workplace, identifies what state each robotic device is currently in (e.g., ROBOT #1 and ROBOT #2 are each scanning the environment, but other options may include "Picking" or "En route," among other possibilities), and identifies how many total boxes each robotic device has correctly manipulated.

In the scenario illustrated in FIG. 5, the control system 400 has determined multiple box hypotheses with "HIGH" confidence, and thus it is likely that the human user (i.e., REMOTE ASSISTOR #1) would select the "Accept" option in response to receiving the request for remote assistance with segmenting region 404. After the user verifies that the control system correctly determined the box hypotheses of region 404, the control system may receive the response and perform another task, such as (i) causing ROBOT #1 to pick up and move the boxes of region 404, (ii) sending out another request for remote assistance with determining a segmented order in which to pick up and move the boxes of region 404, or (iii) perform another type of task to facilitate picking up and moving the boxes of region 404.

Figure 6:
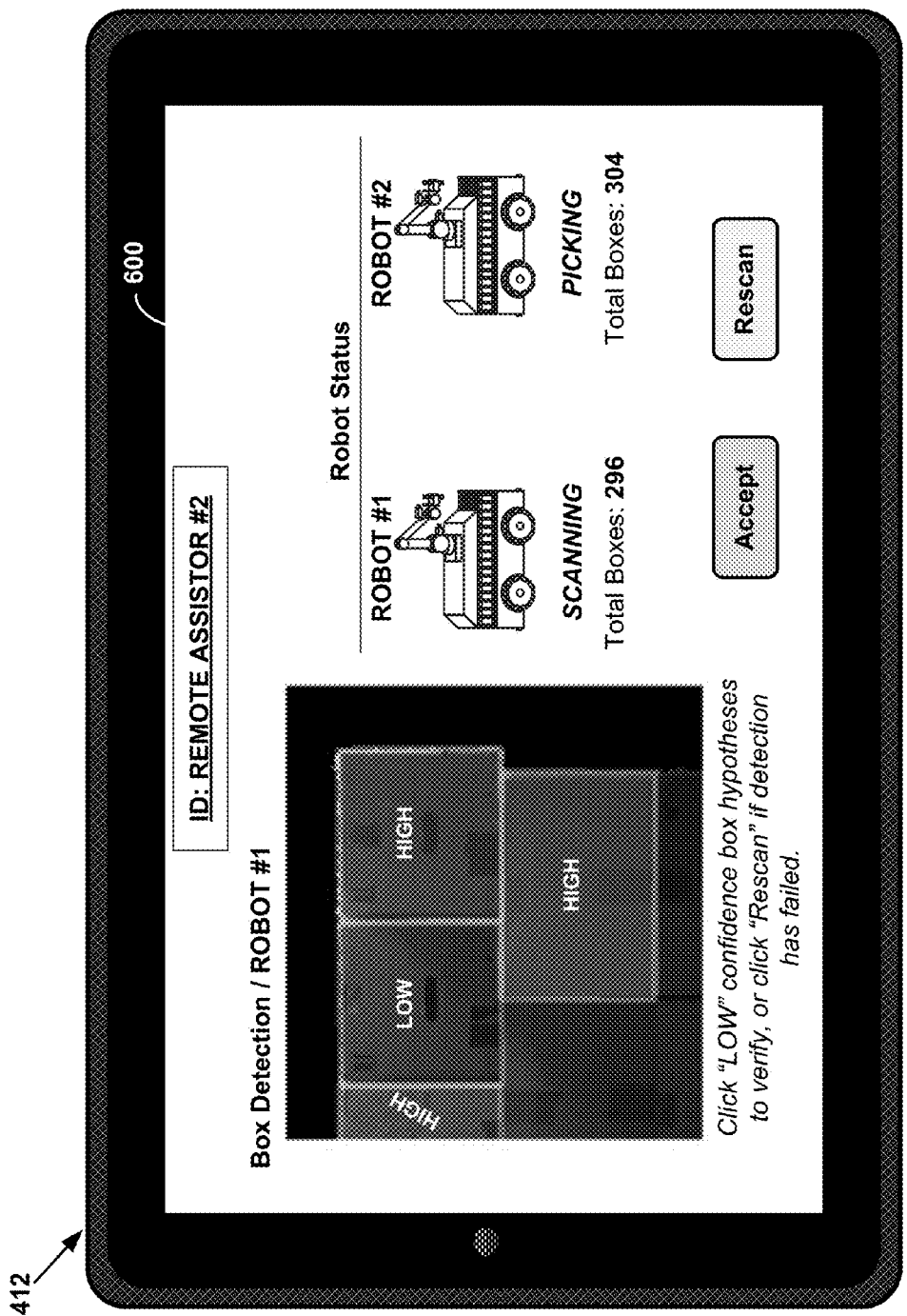
FIG. 6 illustrates an example interface of a remote assistor device, in accordance with at least some implementations described herein.

FIG. 6 illustrates an example interface of a remote assistor device, in accordance with at least some implementations described herein. In particular, FIG. 6 illustrates the second remote assistor device 412 of FIG. 4, which received a request for remote assistance with segmenting region 406 in parallel with the first remote assistor device 410 receiving a request for remote assistance with segmenting region 404. Like the first remote assistor device, the second remote assistor device is shown as a tablet computing device with a touchscreen GUI 600. The GUI includes an indication of the identified task for which the control system 400 requested remote assistance (e.g., "Box Detection"), an indication of a user identifier of the human user operating the first remote assistor device (e.g., "REMOTE ASSISTOR #2"), as well as an indication of which robotic device in the workplace will be performing at least a portion of the identified task (e.g., "ROBOT #1"). Accordingly, ROBOT #1 will pick up the boxes of region 404 before picking up the boxes of region 406 because the request sent to the first remote assistor was of higher priority.

The GUI 600 also includes a visual representation of region 406, box hypotheses that the control system determined for region 404, and confidence "scores" associated with various box hypotheses (e.g., "HIGH" for three box hypotheses and "LOW" for another). Further, the GUI includes an option for the human user to either "Accept" the box hypotheses determined by the control system for region 406 or instruct the control system to "Rescan" and thereby determine new box hypotheses. Still further, the GUI includes a "Robot Status" portion.

In the scenario illustrated in FIG. 6, the control system 400 has determined multiple box hypotheses with "HIGH" confidence, and although the control system has determined one box hypothesis with "LOW" confidence, it is likely that the human user (i.e., REMOTE ASSISTOR #2) would select the "Accept" option in response to receiving the request for remote assistance with segmenting region 406 because the "LOW" confidence box hypothesis appears to be correct. After the user verifies that the control system correctly determined the box hypotheses of region 406, the control system may receive the response and perform another task, such as (i) causing ROBOT #1 to pick up and move the boxes of region 406 after causing ROBOT #1 to pick up and move the boxes of region 404, (ii) sending out another request for remote assistance with determining a segmented order in which to pick up and move the boxes of region 406, or (iii) perform another type of task to facilitate picking up and moving the boxes of region 406.

Figure 7:
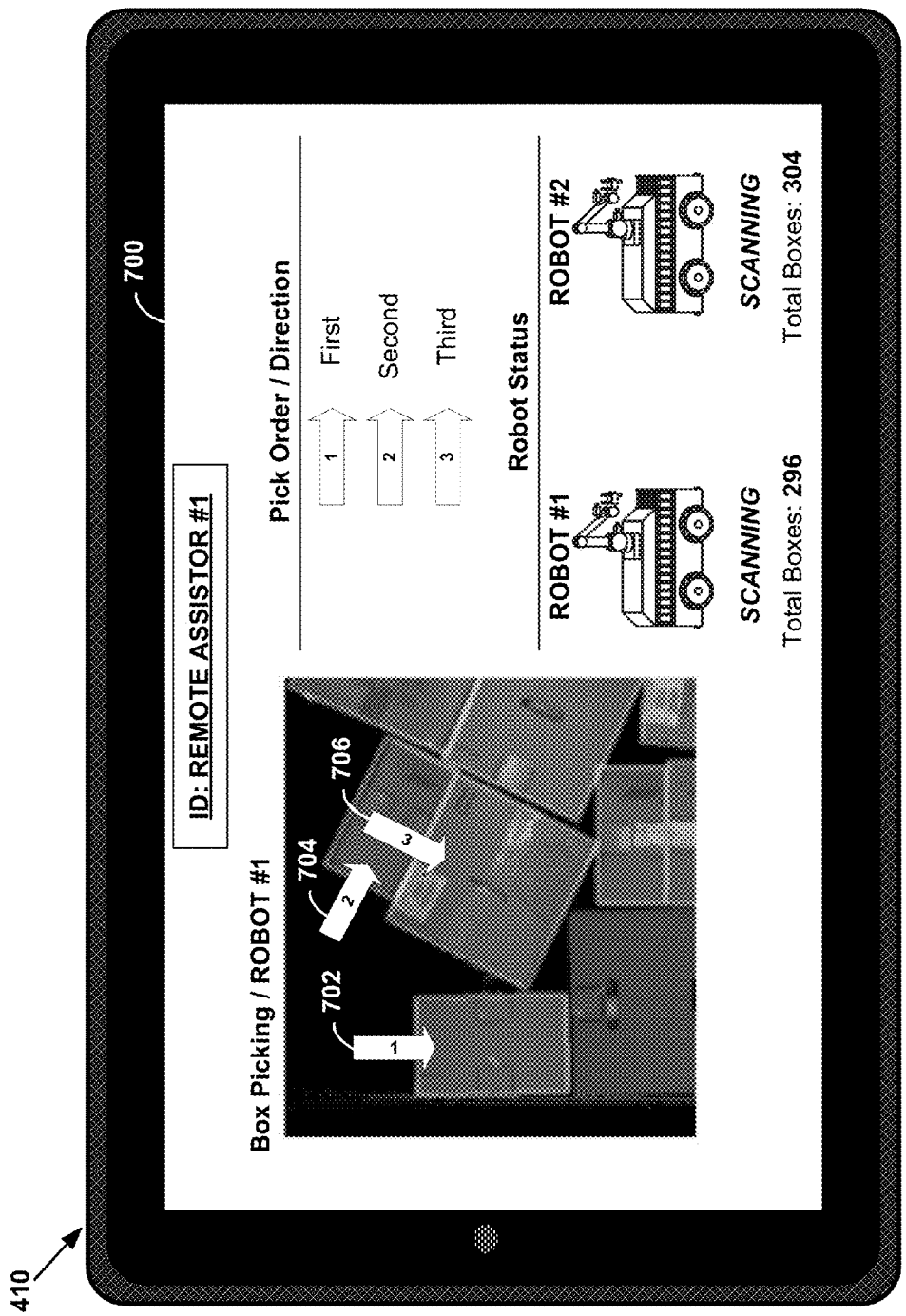
FIG. 7 illustrates an example interface of a remote assistor device, in accordance with at least some implementations described herein.

FIG. 7 illustrates an example interface of a remote assistor device, in accordance with at least some implementations described herein. In particular, FIG. 7 illustrates the first remote assistor device 410 of FIG. 4 after having been requested by the control system 400 to provide remote assistance with (i) determining a sequenced order in which to pick the boxes of region 404 and (ii) determining a location on each detected box of region 404 at which to cause ROBOT #1 to grip the box and remote the box from the stack. Accordingly, the touchscreen GUI 700 displayed on the first remote assistor device includes an indication of the identified task for which the control system 400 requested remote assistance (e.g., "Box Picking"), an indication that ROBOT #1 will be performing the task, and an indication of "Robot Status."

Furthermore, the GUI 700 includes movable graphical elements 702, 704, and 706 overlaying the image of region 404, which take the form of arrows with respective numbers. As shown in the "Pick Order/Direction" portion of the GUI, the arrows correspond to (i) the order in which a particular box will be picked by ROBOT #1 and (ii) where on the particular box ROBOT #1 should grip the particular box. Accordingly, in the scenario illustrated in FIG. 7, the human user may "click and drag" each arrow to a particular box and adjust an orientation of each arrow based on which surface of the particular box the human user believes ROBOT #1 should grip the particular box. For instance, as shown, arrow 702 is placed so as to indicate to the control system 400 that the leftmost detected box should be picked up and removed off the stack first and gripped on its top surface, arrow 704 is placed so as to indicate to the control system 400 that the topmost leaning box should be picked up and removed off the stack second and gripped on its left surface, and arrow 706 is placed so as to indicate to the control system 400 that the larger leaning box should be picked up and removed off the stack third and gripped on its top surface.

Figure 8:
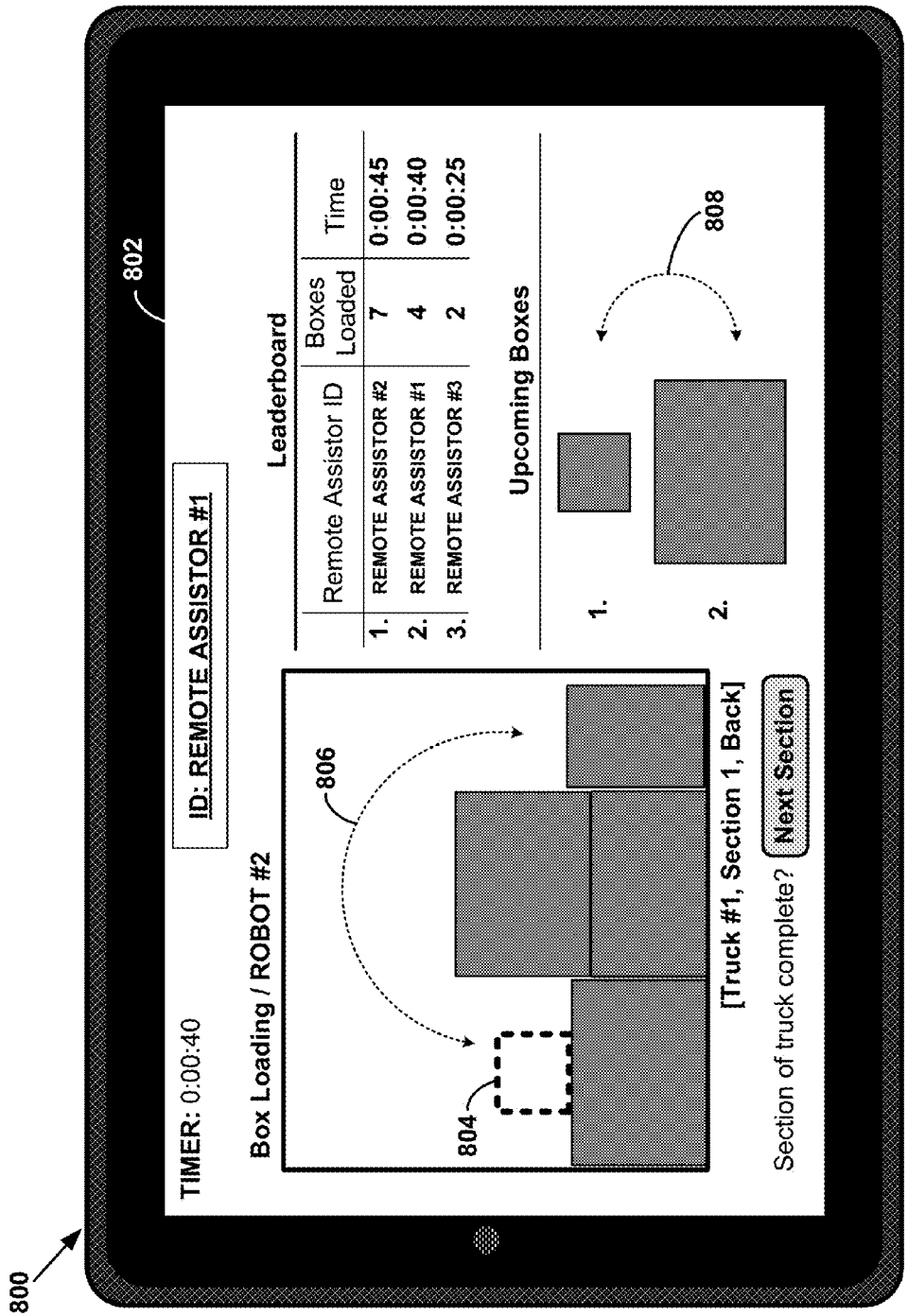
FIG. 8 illustrates an example interface of a remote assistor device, in accordance with at least some implementations described herein.

FIG. 8 illustrates an example interface of a remote assistor device, in accordance with at least some implementations described herein. In particular, FIG. 8 illustrates a remote assistor device 800, operated by a human user (i.e., REMOTE ASSISTOR #1), through which the human user can provide a response to a request for remote assistance with ROBOT #2 loading boxes into a truck. In this scenario, the human user may be competing with other human users in the workplace and the control system may determine which human user can cause their respective robotic manipulator to load the most boxes into their respective truck in the fastest amount of time. Accordingly, the GUI 802 displayed on the remote assistor device may include graphical elements to assist the human user with providing a response that involves determining (i) which box ROBOT #2 should load next and (ii) where in the truck ROBOT #2 should place the box.

As shown, these graphical elements include (i) a visual representation of a region of the truck (e.g., the far back of the truck), (ii) visual geometric representations of the boxes that are currently loaded in the truck and boxes that are to be loaded in the truck (iii) an "Upcoming Boxes" portion that shows which box ROBOT #2 will load next, (iv) a visual indication 804 of where in the truck ROBOT #2 will load the next box, (v) a visual indication in the top-left corner of the GUI 802 of how much time has elapsed since performance of the task begun, (vi) a selectable option to begin loading another section of the truck, such as after the back of the truck is stacked full of boxes (e.g., the "Next Section" button), and (vii) a leaderboard indicating a ranking of human users by how many boxes they have loaded and how long it took them to load their boxes. The leaderboard may be dynamically updated by the control system or a server in communication with the control system.

Furthermore, by touching the touchscreen, or by other methods of user input, the human user can determine (i) which box ROBOT #2 should load next and (ii) where in the truck ROBOT #2 should place the box. For instance, the human user can touch along path 806 to move the visual indication 804 of the upcoming small box to a more desirable location where the box might better fit in the stack. Alternatively, the human user can touch along path 808 to select a new, larger box to load next instead of the smaller box, as it may be more desirable to load larger boxes first and/or it may be more desirable to load the larger box into the large gap between the left wall of the truck and the box in the second row of the stack. Other graphical elements and methods for providing a response to requests for remote assistance for this and other identified tasks are possible as well.

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are operational entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A computing system for controlling a robotic manipulator, the computing system comprising:
   at least one processor; and
   data storage comprising instructions executable by the at least one processor to cause the computing system to perform operations comprising:
      determining, from a model of a set of objects in an environment of the robotic manipulator, a plurality of regions of the model, wherein each region corresponds to a respective different subset of the set of objects, and wherein the robotic manipulator is configured to perform, for each subset of objects, a respective task involving a manipulation of the subset of objects;

identifying a plurality of the tasks for which the computing system will request remote assistance;

determining a priority queue of requests for remote assistance associated with the identified tasks based on expected times at which the robotic manipulator will perform the identified tasks for each subset of objects;

requesting, according to the priority queue and from at least one remote assistor device, remote assistance associated with the identified tasks;

receiving, from the at least one remote assistor device, a plurality of responses to the requesting, wherein each response includes information indicative of how to perform the manipulation of the respective subset of objects; and causing the robotic manipulator to perform the identified tasks based at least in part on the plurality of responses received from the at least one remote assistor device.

2. The computing system of claim 1, wherein at least one of the identified tasks includes (i) identifying one or more locations on each object of the respective subset of objects and (ii) gripping the respective subset of objects at the one or more locations on each object of the respective subset of objects.

3. The computing system of claim 1, wherein at least one of the identified tasks includes determining a sequenced order in which to perform the manipulation of each object of the respective subset of objects.

4. The computing system of claim 1, wherein at least one of the identified tasks includes (i) determining a segmentation of the respective subset of objects and (ii) performing the manipulation of the respective subset of objects based on the determined segmentation.

5. The computing system of claim 1, wherein at least one of the identified tasks includes (i) identifying a virtual boundary line separating two adjacent objects of the respective subset of objects and (ii) performing the manipulation of the respective subset of objects based on the identified virtual boundary line.

6. The computing system of claim 1, wherein the set of objects comprises a set of boxes, and wherein the model comprises a two-dimensional (2D) image of a façade of the set of boxes.

7. The computing system of claim 1, the operations further comprising:

determining a confidence score associated to each region, wherein the confidence score indicates a level of confidence in how to perform the respective task involving the manipulation of the subset of objects of the respective region, wherein identifying the plurality of the tasks for which the computing system will request remote assistance is based at least in part on the determined confidence scores.

8. The computing system of claim 1, wherein the at least one remote assistor device includes a plurality of remote assistor devices, wherein determining the priority queue of requests for remote assistance comprises assigning, to each remote assistor device of the plurality of remote assistor devices, at least one respective request based on a predetermined remote assistor rating of the remote assistor device, wherein the predetermined remote assistor rating indicates a history of whether the robotic manipulator has correctly performed previous tasks based on at least one response that the computing system has previously received from the remote assistor device, and wherein requesting, according to the priority queue and from the at least one remote assistor device, remote assistance associated with the identified tasks comprises sending the requests to the plurality of remote assistor devices based on the assigning.

9. The computing system of claim 8, wherein the assigning is based on a determination that the predetermined remote assistor rating exceeds a predetermined threshold.

10. A method comprising:

determining, from a model of a set of objects in an environment of a robotic manipulator, a plurality of regions of the model, wherein each region corresponds to a respective different subset of the set of objects, and wherein the robotic manipulator is configured to perform, for each subset of objects, a respective task involving a manipulation of the subset of objects;

identifying a plurality of the tasks for which the computing system will request remote assistance;

determining a priority queue of requests for remote assistance associated with the identified tasks based on expected times at which the robotic manipulator will perform the identified tasks for each subset of objects;

requesting, according to the priority queue and from at least one remote assistor device, remote assistance associated with the identified tasks;

receiving, from the at least one remote assistor device, a plurality of responses to the requesting, wherein each response includes information indicative of how to perform the manipulation of the respective subset of objects; and causing the robotic manipulator to perform the identified tasks based at least in part on the plurality of responses received from the at least one remote assistor device.

11. The method of claim 10, further comprising:

in response to causing the robotic manipulator to perform the identified tasks based at least in part on the plurality of responses, determining task performance statistics associated to each of the at least one remote assistor device, wherein the task performance statistics indicate whether the robotic manipulator correctly performed each of the identified tasks based on the information included in each of the plurality of responses; and providing, to each of the at least one remote assistor device, a notification of the determined task performance statistics.

12. The method of claim 11, wherein the determined task performance statistics indicate one or more of: (i) a percentage of each type of identified task the robotic manipulator has correctly performed based on information included in responses received from the remote assistor device and (ii) an amount of time taken by the robotic manipulator to perform each identified task based on the information included in the responses received from the remote assistor device.

13. The method of claim 10, wherein the at least one remote assistor device includes a plurality of different remote assistor devices, wherein requesting, according to the priority queue and from the at least one remote assistor device, remote assistance associated with the identified tasks comprises sending a given request to each remote assistor device of the plurality of remote assistor devices, wherein receiving the plurality of responses from the at least one remote assistor device comprises receiving respective responses to the given request from each remote assistor device of the plurality of remote assistor devices, and wherein causing the robotic manipulator to perform the identified tasks based at least in part on the plurality of responses received from the at least one remote assistor device comprises causing the robotic manipulator to perform the identified tasks based on an aggregation of the respective responses to the given request received from each remote assistor device.

14. The method of claim 10, wherein requesting, according to the priority queue and from the at least one remote assistor device, remote assistance associated with the identified tasks comprises sending, to the at least one remote assistor device, the requests for remote assistance with the identified tasks, wherein each request includes an indication of the respective region associated to the respective identified task.

15. A non-transitory computer readable medium having stored thereon instructions that, upon execution by a computing system configured to control a robotic manipulator, cause the computing system to perform operations comprising:

determining, from a model of a set of objects in an environment of the robotic manipulator, a plurality of regions of the model, wherein each region corresponds to a respective different subset of the set of objects, and wherein the robotic manipulator is configured to perform, for each subset of objects, a respective task involving a manipulation of the subset of objects;

identifying a plurality of the tasks for which the computing system will request remote assistance;

determining a priority queue of requests for remote assistance associated with the identified tasks based on expected times at which the robotic manipulator will perform the identified tasks for each subset of objects;

requesting, according to the priority queue and from at least one remote assistor device, remote assistance associated with the identified tasks;

receiving, from the at least one remote assistor device, a plurality of responses to the requesting, wherein each response includes information indicative of how to perform the manipulation of the respective subset of objects; and causing the robotic manipulator to perform the identified tasks based at least in part on the plurality of responses received from the at least one remote assistor device.

16. The non-transitory computer readable medium of claim 15, wherein at least one of the identified tasks includes (i) identifying one or more locations on each object of the respective subset of objects and (ii) gripping the respective subset of objects at the one or more locations on each object of the respective subset of objects, the operations further comprising:

determining a confidence score associated to each region, wherein the confidence score indicates a level of confidence in how to identify the one or more locations on each object of the respective subset of objects, wherein identifying the plurality of the tasks for which the computing system will request remote assistance is based at least in part on the determined confidence scores.

17. The non-transitory computer readable medium of claim 15, wherein at least one of the identified tasks includes determining a sequenced order in which to perform the manipulation of each object of the respective subset of objects, the operations further comprising:

determining a confidence score associated to each region, wherein the confidence score indicates a level of confidence in how to determine the sequenced order in which to perform the manipulation of each object of the respective subset of objects, wherein identifying the plurality of the tasks for which the computing system will request remote assistance is based at least in part on the determined confidence scores.

18. The non-transitory computer readable medium of claim 15, wherein at least one of the identified tasks includes (i) determining a segmentation of the respective subset of objects and (ii) performing the manipulation of the respective subset of objects based on the determined segmentation, the operations further comprising:

determining a confidence score associated to each region, wherein the confidence score indicates a level of confidence in how to determine a segmentation that distinguishes boundaries of the subset of objects of the respective region, wherein identifying the plurality of the tasks for which the computing system will request remote assistance is based at least in part on the determined confidence scores.

19. The non-transitory computer readable medium of claim 15, wherein determining the priority queue of requests for remote assistance associated with the identified tasks based on expected times at which the robotic manipulator will perform the identified tasks for each subset of objects comprises rank-ordering the requests in order of the expected times at which the robotic manipulator will perform each of the identified tasks so as to define a particular order in which to send the requests, and wherein requesting, according to the priority queue and from the at least one remote assistor device, remote assistance associated with the identified tasks comprises sending, in the particular order, the requests to the at least one remote assistor device.

20. The non-transitory computer readable medium of claim 15, wherein the at least one remote assistor device includes a plurality of remote assistor devices, the operations further comprising:

in response to causing the robotic manipulator to perform the identified tasks based at least in part on the plurality of responses, determining, for each remote assistor device of the plurality, task performance statistics indicating (i) a percentage of each type of identified task the robotic manipulator has correctly performed based on information included in responses received from the remote assistor device and (ii) an amount of time taken by the robotic manipulator to correctly perform each identified task based on the information included in responses received from the remote assistor device;

determining a ranking of the plurality of remote assistor devices based on the task performance statistics determined for each remote assistor device; and providing, to each remote assistor device of the plurality, a notification of the determined ranking.

* * * * *